(12) United States Patent
Han et al.

(10) Patent No.: US 9,273,181 B2
(45) Date of Patent: Mar. 1, 2016

(54) POLYESTER-BASED POLYMER HAVING SUPERIOR TRANSPARENCY AND HIGH HEAT RESISTANCE AND PREPARATION OF THE SAME

(71) Applicant: INDUSTRY-UNIVERSITY COOPERATION FOUNDATION HANYANG UNIVERSITY, Seoul (KR)

(72) Inventors: Yang-Kyoo Han, Seoul (KR); Minhee Jang, Seoul (KR); Byung Kook Lee, Seoul (KR); Injoon Byun, Incheon (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 14/511,832

(22) Filed: Oct. 10, 2014

(65) Prior Publication Data

US 2015/0376329 A1 Dec. 31, 2015

(30) Foreign Application Priority Data

Jun. 26, 2014 (KR) ........................ 10-2014-0078778

(51) Int. Cl.
- C08G 63/02 (2006.01)
- C08G 63/688 (2006.01)
- C08G 63/81 (2006.01)

(52) U.S. Cl.
CPC .............. *C08G 63/688* (2013.01); *C08G 63/81* (2013.01)

(58) Field of Classification Search
CPC .................................................... C08G 63/193

USPC .................. 528/173, 176, 190, 193, 271, 272
See application file for complete search history.

(56) References Cited

PUBLICATIONS

Hsiao et al. Polyarylates Containing Sulfone Ether Linkages, Dept. of Chem. Eng. Received Sep. 11, 2000, Accepted Oct. 25, 2000.*

* cited by examiner

*Primary Examiner* — Terressa Boykin
(74) *Attorney, Agent, or Firm* — Oblon, McClelland, Maier & Neustadt, L.L.P.

(57) ABSTRACT

Provided is a novel aromatic polyester-based polymer. The aromatic polyester-based polymer includes the repeating unit represented by the following Chemical Formula I and contains at least one aromatic diol monomer. The aromatic polyester-based polymer has a high glass transition temperature and excellent heat resistance, mechanical properties and transparency, as well as shows excellent formability and processability into films or the like, and thus solves the problems occurring in the conventional crystalline or amorphous engineering plastic materials. In addition, the aromatic polyester-based polymer may be applied to next-generation engineering plastic composite materials, such as matrix resins of composite materials for cars and airplanes. The aromatic polyester-based polymer may also be applied to flexible substrates for next-generation flexible displays, solar cells or electronic paper requiring transparency and high heat resistance at the same time.

[Chemical Formula I]

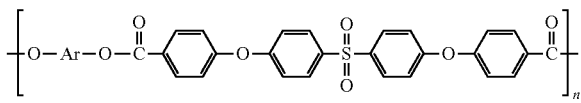

18 Claims, 2 Drawing Sheets

POLYESTER-BASED POLYMER HAVING SUPERIOR TRANSPARENCY AND HIGH HEAT RESISTANCE AND PREPARATION OF THE SAME

CROSS-REFERENCE TO RELATED APPLICATIONS

This application claims priority under 35 U.S.C. §119 to Korean Patent Application No. 10-2014-0078778 filed on Jun. 26, 2014 in the Korean Intellectual Property Office, the disclosure of which is incorporated herein by reference in its entirety.

TECHNICAL FIELD

The following disclosure relates to a novel aromatic polyester-based polymer. More particularly, the following disclosure relates to an aromatic polyester-based polymer having a high glass transition temperature and excellent heat resistance, mechanical properties, transparency and film formability, and a method for preparing the same.

BACKGROUND

High-performance engineering plastics having excellent heat resistance have received many attentions as advanced materials. Among such engineering plastics, poly(ether ether ketone) (PEEK), poly(ether ketone) (PEK), poly(arylene ether ketone), etc. having aromatic benzene rings introduced to the polymer chain repeatedly have been used as matrix resins of composite materials for use in airplanes and cars by virtue of their superior properties, including high mechanical strength, excellent thermal stability and chemical resistance. However, such aromatic polymers show many problems when they are synthesized or processed at a temperature of their melting temperature (Tm) or higher due to their unique crystalline structures and low solubility. Particularly, they have poor formability into films or the like. In addition, while they have excellent mechanical properties by virtue of a high Tm of about 240° C. or higher, they are disadvantageous in that they show a rapid drop in elastic modulus near Tg because of a low glass transition temperature (Tg) of about 140-160° C. Further, they show insufficient transparency due to the above-mentioned low solubility and crystalline structures.

Meanwhile, it is known that other poly(arylene ether sulfone)-based polymers, such as poly(ether sulfone) (PES), poly(aryl sulfone) (PAS) and polysulfone (PSF) known as engineering plastics have an amorphous structure and a relatively high Tg of about 190° C. or higher. In addition, such polymers have relatively high solubility to various solvents and excellent processability and formability into films. Moreover, it is also known that films including such polymers have a relatively high transparency of about 80% or more to a wavelength of about 400-600 nm. However, since such polymers have an amorphous structure, they are disadvantageous in that they have lower mechanical properties, including mechanical strength, modulus or a coefficient of linear thermal expansion as compared to the above-mentioned crystalline polymers such as poly(arylene ether ketone).

Due to the disadvantages of such polymers, an attempt has been made to physically mix (blend) crystalline aromatic poly(arylene ether ketone) with amorphous aromatic poly(arylene ether sulfone) to obtain a composite material for high-performance engineering plastics. However, a compatibilizer having a specific chemical structure is required essentially in order to obtain applicable properties by blending the crystalline polymer with amorphous polymer. Moreover, it is difficult to prepare high-performance engineering plastics and films showing excellent transparency simultaneously with high resistance, which, otherwise are in an inversely proportional relationship, merely by a simple physical blending process.

Due to such disadvantages of the conventional polymers, many researches and developments have been conducted continuously about novel polymers having a high glass transition temperature in combination with excellent heat resistance, mechanical properties and film formability with advanced countries as the center. Particularly, since new materials are required in various industrial fields, including flexible substrate materials for displays, solar cells and electronic paper that are key part materials of the next-generation advanced industry, as well as canopy films of combat planes and space crafts, transparent materials for space industry, or electronic and semiconductor industry, a novel polymer satisfying the above-mentioned excellent properties at the same time has been required continuously and active studies have been made about such a novel polymer.

Particularly, it is expected that the next-generation megatrend in the display, solar cell and electronic paper industry is formed largely of making ubiquitous as well as imparting flexibility and high quality image and scale-up. Therefore, it is also expected that there is a geometric increase in demand for novel transparent and highly heat resistant plastic materials suitable for such a technical megatrend.

According to such economic demand, the polyarylate-based polymer (PAR) available from Ferrania Image Technologies (Italy), cycloolefin-based polymers (COP/COC) available from Promerus (USA), polyimides (PI) available from General Electric (USA), Dupont (USA) and Mitsubishi Gas Chem (Japan), polyether sulfone polymers (PES) available from Sumitomo Bakelite (Japan) and BASF (Germany), etc. have been developed as novel materials of transparent and highly heat resistant polymeric films for flexible plastic substrates. On the other hand, in Korea, only I-Component Company has developed a film for display substrates by using an optical PES polymer available from BASF.

However, the above-mentioned novel materials of polymer films that have been developed in many countries are still insufficient to satisfy all of the technical requirements in terms of high heat resistance, mechanical properties, transparency and film formability.

SUMMARY

An embodiment of the present invention is directed to providing a novel aromatic polyester-based polymer having a high glass transition temperature, and excellent heat resistance, mechanical properties, transparency and film formability, and a method for preparing the same.

In an aspect, there is provided an aromatic polyester-based polymer including a repeating unit represented by the following Chemical Formula I and containing at least one aromatic diol monomer:

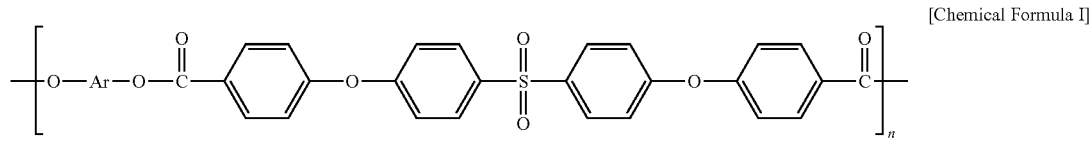

[Chemical Formula I]

wherein Ar is a substituted or non-substituted $C_6$-$C_{40}$ aromatic cyclic group, *—O—Ar—O—* is a diphenoxy structure derived from cardo based aromatic diol structures, non-cardo based aromatic diol structures or mixtures thereof, and n is an integer of 10-500.

According to an embodiment, *—O—A—O—* derived from cardo based aromatic diols may be at least one structure selected from the following Structural Formula 1:

[Structural Formula 1]

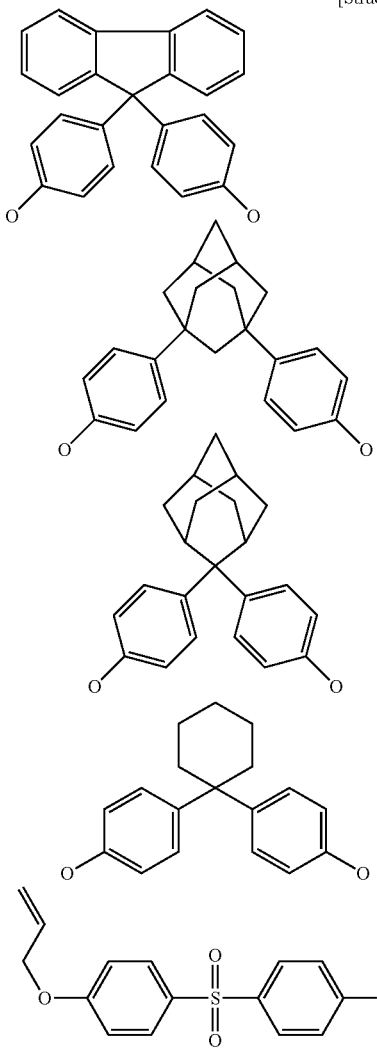

-continued

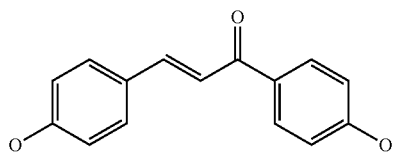

According to another embodiment, *—O—Ar—O—* derived from non-cardo based aromatic diols may be at least one structure selected from the following Structural Formula 2:

[Structural Formula 2]

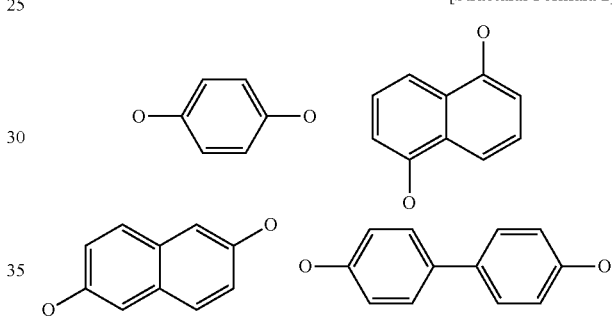

According to still another embodiment, the aromatic polyester-based polymer has a number average molecular weight (Mn) of 3000-300,000 and a glass transition temperature (Tg) of 230° C. or higher.

In another aspect, there is provided a method for preparing the aromatic polyester-based polymer represented by the above Chemical Formula I, including dissolving an aromatic diol salt represented by the following Chemical Formula II and on aromatic diacyl chloride compound (4,4'-(4,4'-sulfonyl-bis(4,1-phenylene)bis(oxy)dibenzoic chloride, SPO-BAC) represented by the following Chemical Formula III into water to which a surfactant is added and a nonpolar solvent, respectively, at a molar equivalent ratio, and carrying out interfacial polycondensation:

[Chemical Formula II]

$^+M^-O—Ar—O^-M^+$

[Chemical Formula III]

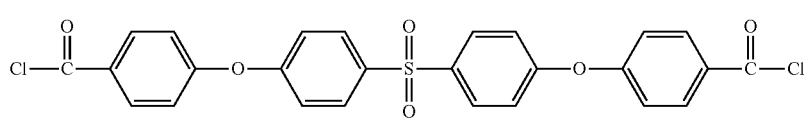

In Chemical Formula II, M⁺ is an alkali metal cation, Ar is a substituted or non-substituted $C_6$-$C_{40}$ aromatic cyclic group, and ⁻O—Ar—O⁻ is a diphenoxy anion derived from cardo based aromatic diol structures, non-cardo based aromatic diol structures or mixtures thereof.

According to an embodiment, the aromatic diol salt may be an alkali metal salt derived from at least one cardo based aromatic diol selected from the group consisting of 9,9-bis(4-hydroxyphenyl)fluorene (BPF), 1,3-bis(4-hydroxyphenyl)adamantane (1,3-BPA), 2,2-bis(4-hydroxyphenyl)adamantane (2,2-BPA), 1,1'-bis(4-hydroxyphonyl)cyclohexane (BPCH), 4,4'-sulfonyl-bis(2-allylphenol) (SBAP) and 4,4'-dihydroxychalcone (DHC), and at least one non-cardo based aromatic diol selected from the group consisting of hydroquinone (HQ), 1,5-naphthalenediol (1,5-NPD), 2,6-naphthalenediol (2,6-NPD) and 4,4'-bisphenol (BP).

According to another embodiment, the aromatic diol salt may be obtained by reacting an aromatic diol having a structure of a cardo based aromatic diol, non-cardo based aromatic diol or a mixture thereof with an alkali metal base, wherein the alkali metal base may be at least one selected from NaOH, KOH and $K_2CO_3$.

According to still another embodiment, the nonpolar solvent may be at least one selected from methylene chloride (MC), 1,2-dichloroethane (DCE), cyclohexane, n-hexane, n-heptane, benzene, toluene, chlorobenzene and a mixed solvent thereof. The surfactant may be at least one selected from the group consisting of benzene tetraethylammonium chloride (BTEAC), benzene tetraethylammonium bromide (BTEAB), tetraethylammonium chloride (TEAC), tetraoctylammonium bromide (TOAB) and tetradodecylammonium chloride (TDAC).

According to still another embodiment, the alkali metal base may be used at a molar equivalent ratio of 1.0-10 based on the aromatic diol, and the surfactant may be used at a molar ratio of 1/10-1/50 based on the aromatic diol salt.

According to yet another embodiment, the interfacial polycondensation may be carried out at 25-135° C. for 2-12 hours.

The aromatic polyester-based polymer has a high glass transition temperature and excellent heat resistance, mechanical properties and transparency, while showing excellent formability and processability into films, etc. As a result, it is possible to solve the problems of the existing crystalline or amorphous engineering plastic materials. In addition, the aromatic polyester-based polymer may be applied to a next-generation engineering plastic composite material such as a matrix resin of composite materials for cars and airplanes. The aromatic polyester-based polymer may also be applied to a flexible substrate requiring transparency and high heat resistance at the same time in the field of next-generation flexible displays, solar cells or electronic paper.

DETAILED DESCRIPTION OF EMBODIMENTS

Figure 1:
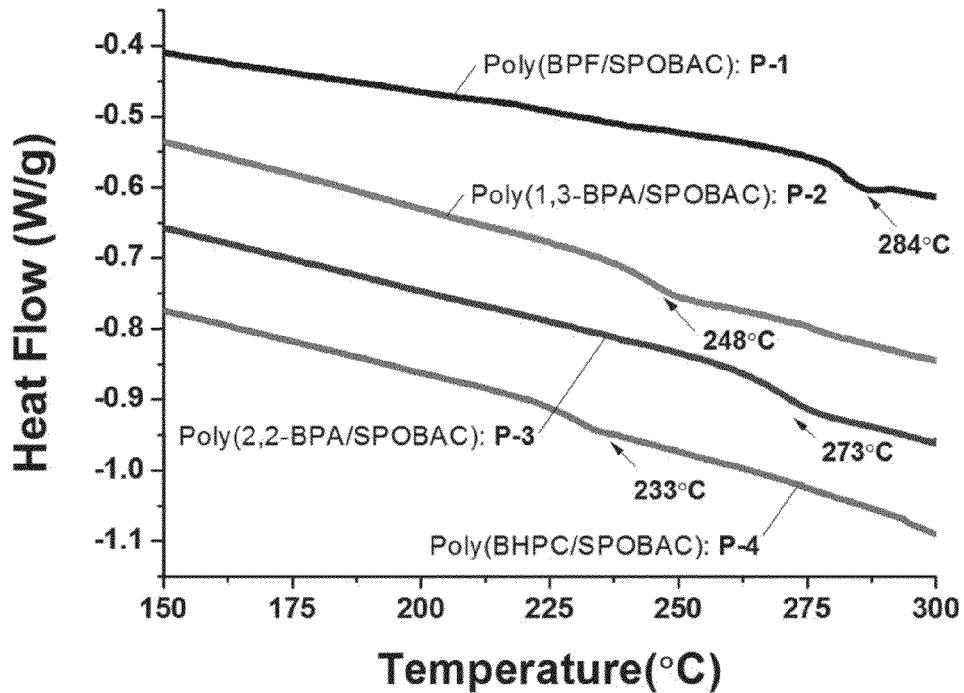
FIG. 1 is a graph illustrating the Differential Scanning Calorimetry (DSC) curves of the polyester-based polymers (P-1 to P-4) obtained from Examples 4 to 7.

Hereinafter, exemplary embodiments will be described in detail with reference to the accompanying drawings.

In one aspect, there is provided an aromatic polyester-based polymer having a high glass transition temperature and excellent heat resistance, mechanical properties and transparency, while showing excellent formability and processability into films, etc. The aromatic polyester-based polymer includes a repeating unit represented by the following Chemical Formula I and contains at least one aromatic diol monomer:

[Chemical Formula I]

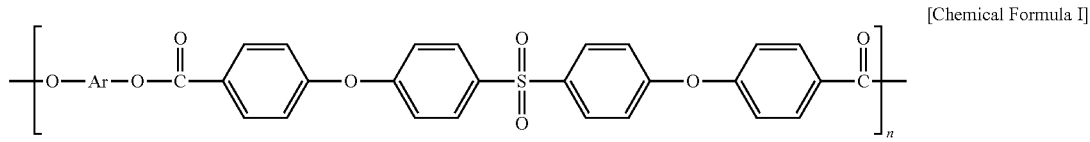

wherein Ar is a substituted or non-substituted $C_6$-$C_{40}$ aromatic cyclic group, *—O—Ar—O—* is a diphenoxy structure derived from cardo based aromatic diol structures, non-cardo based aromatic diol structures or mixtures thereof, and n is an integer of 10-500.

The aromatic polyester-based polymer has a number average molecular weight (Mn) of 3000-300,000 and a glass transition temperature (Tg) of 230° C. or higher.

The aromatic polyester-based polymer has a structure of repeating units in which an aromatic diol having a relatively bulky molecular structure, an aromatic polyethersulfone (PES) as an amorphous polymer having a high glass transition temperature and excellent formability and processability into a film or the like, and an aromatic polyester as a crystalline polymer having excellent heat resistance and mechanical properties are arranged sequentially. As a result, the aromatic polyester-based polymer shows high transparency and high heat resistance at the same time.

In general, in the case of a polymer having a structure in which aromatic groups with very high attraction between polymeric chains are repeated, it is expected that the polymer has a high glass transition temperature and excellent heat resistance and mechanical properties, such as tensile strength and modulus. However, such polymeric chains having the above-mentioned aromatic groups aggregate together to form a crystalline structure. Thus, it is known that a film formed from the polymer undergoes degradation of transparency. In other words, the heat resistance and transparency of a polymer are in an inversely proportional relationship with each other. Thus, it is known that it is difficult to improve the heat resistance and transparency at the same time.

To solve the above-mentioned problem, the novel aromatic polyester-based polymer is characterized in that an aromatic diol having a relatively bulky molecular structure is introduced to the repeating unit structure and a functional group structure having aromatic groups bound to each other by way of a sulfone group, ether group and carbonyl group is also introduced to the repeating unit structure, so that the heat resistance and transparency, which, otherwise, are in an inversely proportional relationship, may be improved at the same time.

In other words, the aromatic diol having a large free volume and flexible groups, such as sulfone and ether, reduce the attraction between aromatic polymer chains and inhibit the formation of a crystalline structure, thereby improving the transparency. In addition to this, the strong attraction between the phenoxy groups introduced to both sides of the aromatic diol compensates for degradation of heat resistance and mechanical properties resulting from such improvement of transparency. As a result, the aromatic polyester-based polymer has not only high transparency but also excellent heat resistance, moisture absorbability and mechanical properties.

In other words, the polymer disclosed herein is an amorphous aromatic polyester-based polymer having a novel structure in which an aromatic polyester structure including a bulky aromatic diol introduced thereto, non-cardo based polyetherperylene structure and an amorphous polyethersulfone structure are arranged sequentially. The polymer has excellent mechanical properties, transparency and film formability, and thus may be applied to a matrix resin of composite materials for cars and airplanes and to an engineering plastic material in various industrial fields. In addition, the polymer may be used as a plastic material for substrates for use in next-generation flexible displays, solar cells or electronic paper requiring various physical properties, such as high transparency, high heat resistance, high quality image, low shrinking property and low moisture absorbability.

In Chemical Formula I, *—O—Ar—O—* derived from cardo based aromatic diols may be at least one structure selected from the following Structural Formula 1:

[Structural Formula 1]

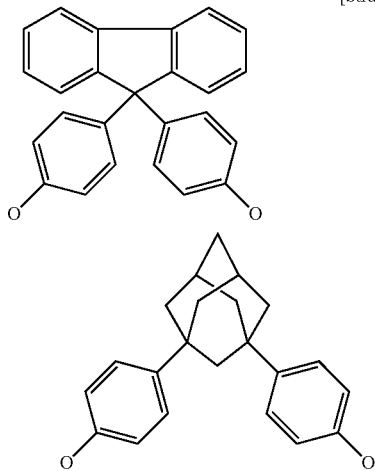

-continued

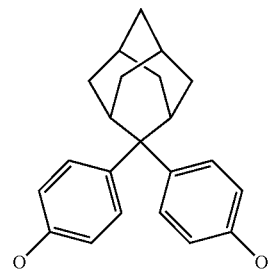

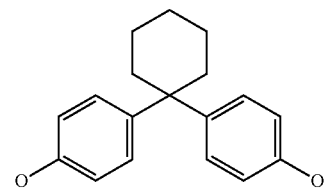

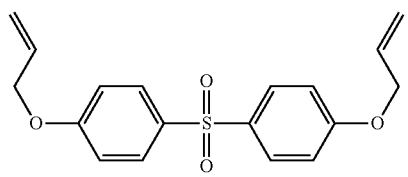

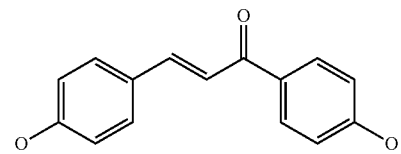

In addition, *—O—Ar—O—* derived from non-cardo based aromatic diols may be at least one structure selected from the following Structural Formula 2:

[Structural Formula 2]

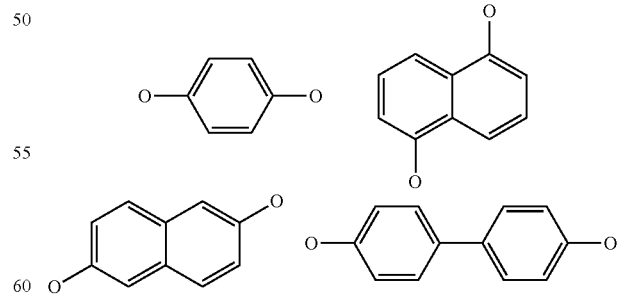

The aromatic polyester-based polymer containing a repeating unit represented by Chemical Formula I may be a polymer containing a repeating unit selected from the following Chemical Formula 1 to Chemical Formula 12, but is not limited thereto;

[Chemical Formula 1]
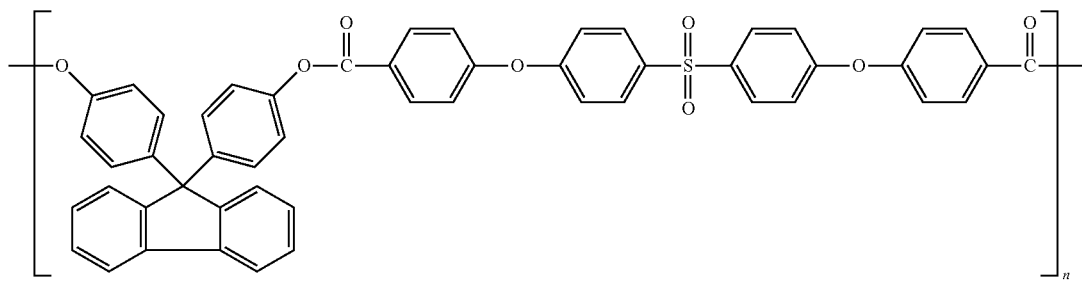
[Chemical Formula 2]
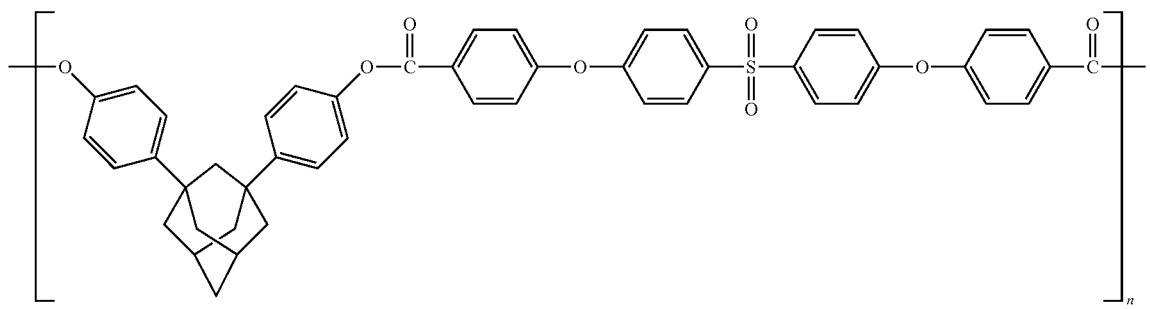
[Chemical Formula 3]
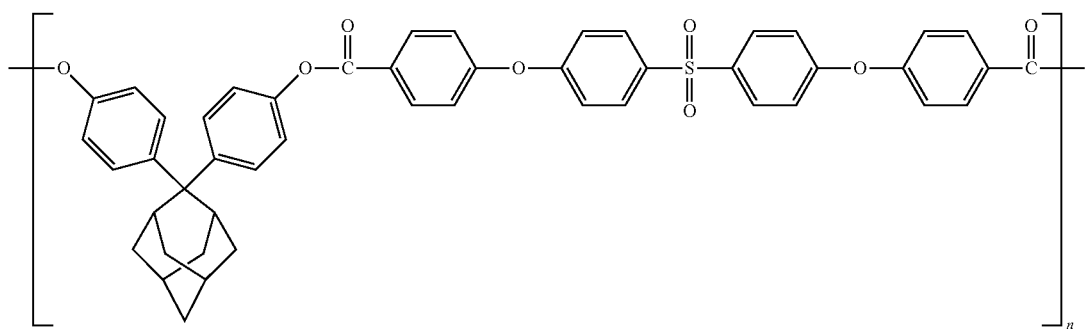
[Chemical Formula 4]
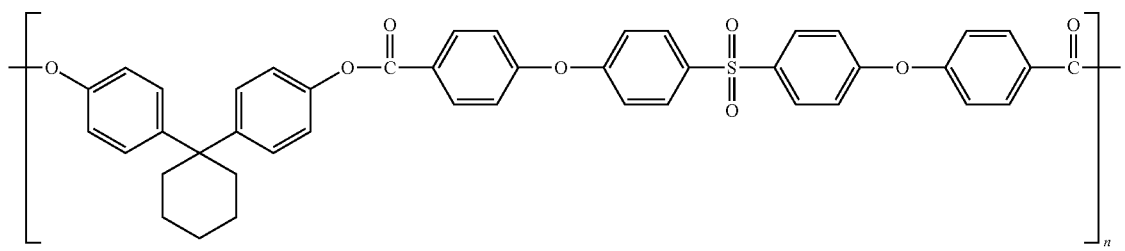
[Chemical Formula 5]
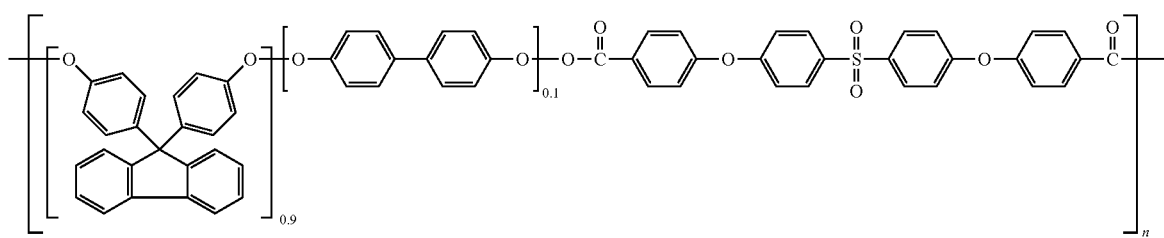

[Chemical Formula 6]
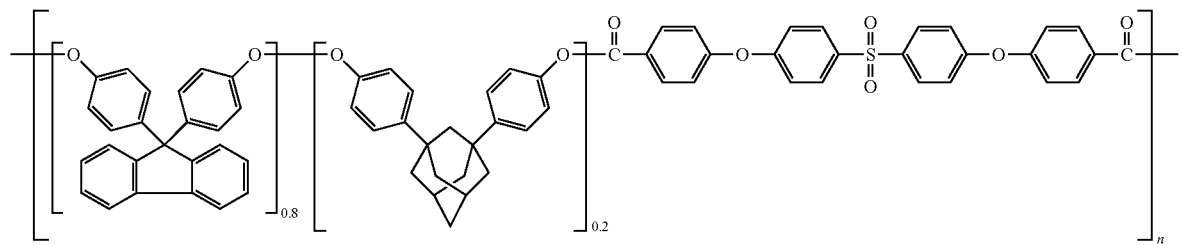
[Chemical Formula 7]
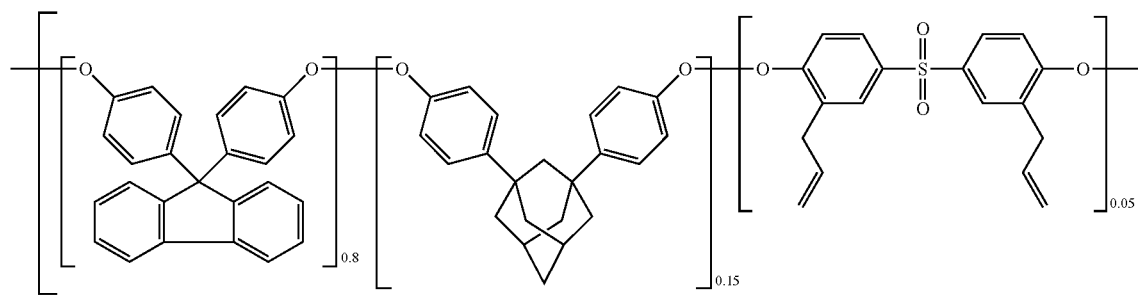
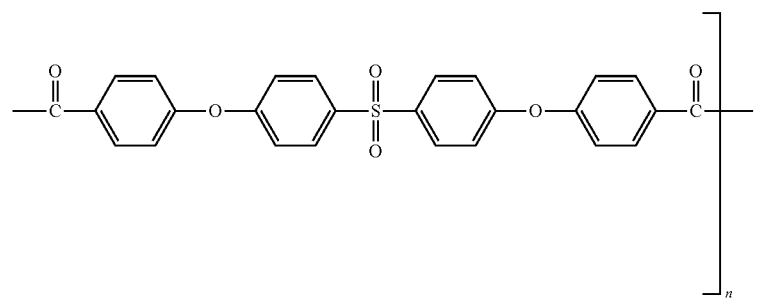
[Chemical Formula 8]
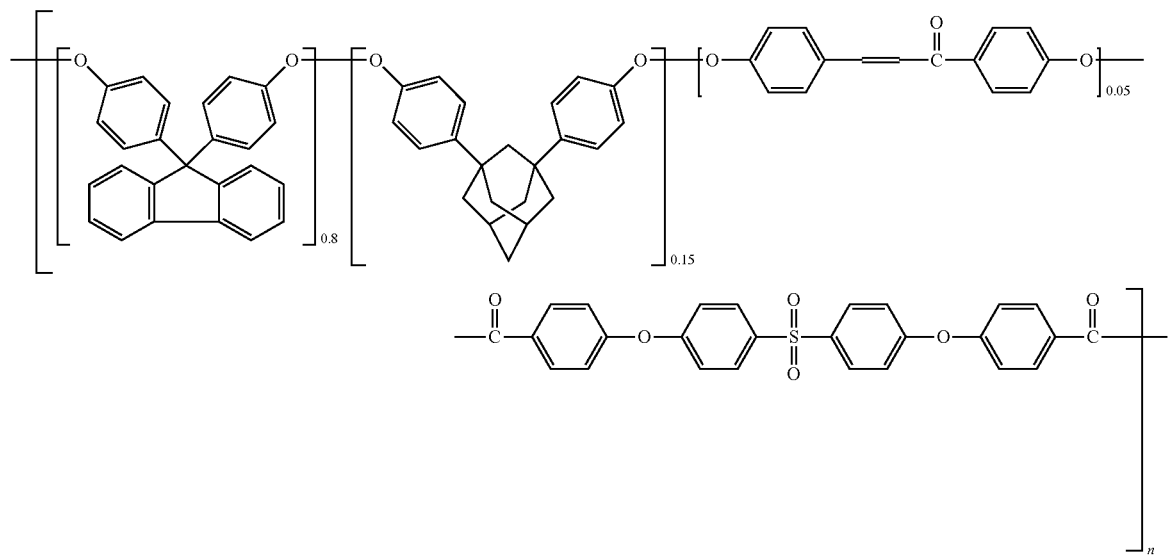

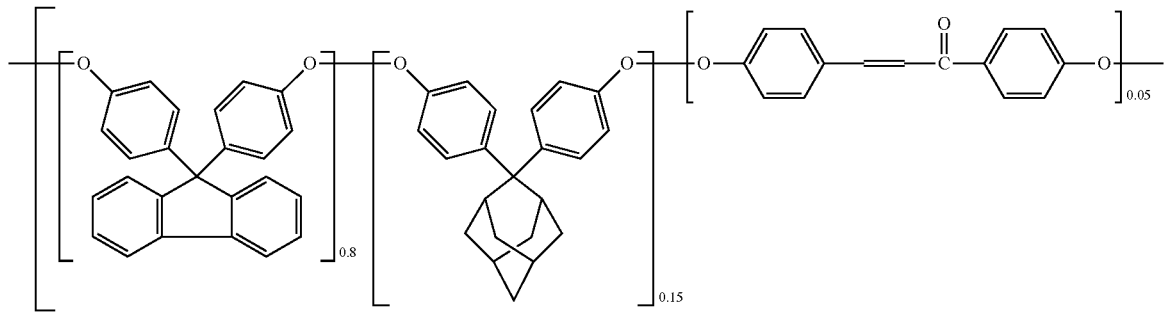

[Chemical Formula 9]

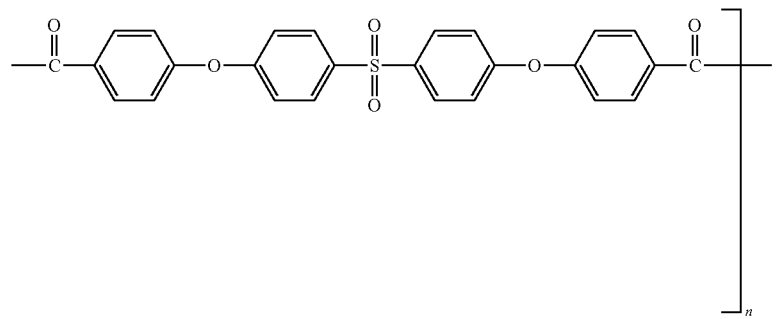

[Chemical Formula 10]

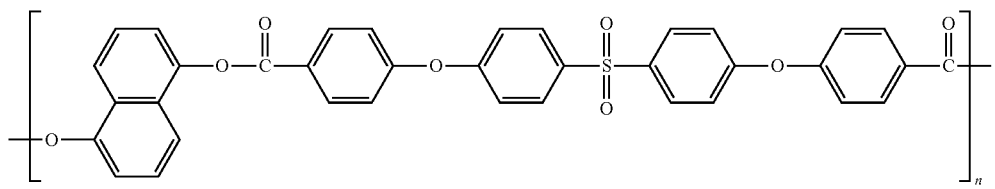

[Chemical Formula 11]

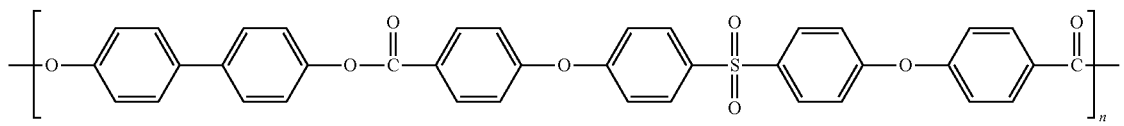

[Chemical Formula 12]

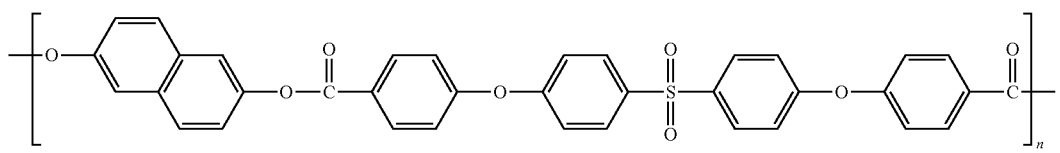

In another aspect, there is provided a method for preparing the aromatic polyester-based polymer represented by the above Chemical Formula I, including dissolving an aromatic diol salt represented by the following Chemical Formula II and an aromatic diacyl chloride compound (4,4'-(4,4'-sulfonyl-bis(4,1-phenylene)bis(oxy)dibenzoic chloride, SPOBAC) represented by the following Chemical Formula III into water to which a surfactant is added and a nonpolar solvent, respectively, at a molar equivalent ratio, and carrying out interfacial polycondensation:

[Chemical Formula II]

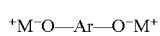

[Chemical Formula III]

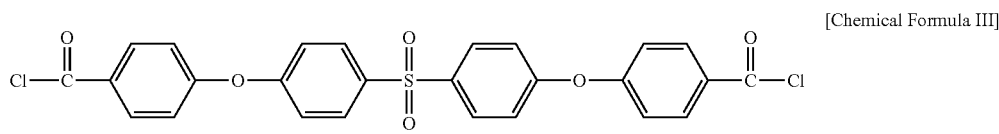

In Chemical Formula II, $M^+$ is an alkali metal cation, Ar is a substituted or non-substituted $C_6$-$C_{40}$ aromatic cyclic group, and $^-O$—Ar—$O^-$ is a diphenoxy anion derived from cardo based aromatic diol structures, non-cardo based aromatic diol structures or mixtures thereof.

Particularly, the aromatic diol salt may be an alkali metal salt derived from at least one cardo based aromatic diol selected from the group consisting of 9,9-bis(4-hydroxyphenyl)fluorene (BPF), 1,3-bis(4-hydroxyphenyl)adamantane (1,3-BPA), 2,2-bis(4-hydroxyphenyl)adamantane (2,2-BPA), 1,1'-bis(4-hydroxyphenyl)cyclohexane (BPCH), 4,4'-sulfonyl-bis(2-allylphenol) (SBAP) and 4,4'-dihydroxychalcone (DHC). The aromatic diol salt may also be at least one non-cardo based aromatic diol selected from the group consisting of hydroquinone (HQ), 1,5-naphthalenediol (1,5-NPD), 2,6-naphthalenediol (2,6-NPD) and 4,4'-bisphenol (BP).

More particularly, as the cardo based aromatic diol monomer, BPF, 1,3-BPA, 2,2-BPA or BPCH prepared by the present inventors and registered as Korean Patent Publication No. 10-1208314 may be used. Otherwise, a photo-crosslinkable cardo based aromatic diol, such as SBAP and DHC, prepared as disclosed herein may be used. In addition, it is preferred to use well-known compounds, such as HQ, 1,5-NPD, 2,6-NPD or BP, as a non-cardo based aromatic diol monomer. Further, SPOBAC prepared first as disclosed herein is used as an aromatic diacyl chloride monomer.

In addition, the aromatic diol salt may be obtained by reacting an aromatic diol having a structure of a cardo based aromatic diol, non-cardo based aromatic diol or a mixture thereof with an alkali metal base, wherein the alkali metal base may be at least one selected from NaOH, KOH and $K_2CO_3$.

Further, the nonpolar solvent may be at least one selected from methylene chloride (MC), 1,2-dichloroethane (DCE), cyclohexane, n-hexane, n-heptane, benzene, toluene, chlorobenzene and a mixed solvent thereof. The surfactant may be at least one selected from the group consisting of benzene tetraethylammonium chloride (BTEAC), benzene tetraethylammonium bromide (BTEAB), tetraethylammonium chloride (TEAC), tetraoctylammonium bromide (TOAB) and tetradodecylammonium chloride (TDAC).

Additionally, the alkali metal base may be used at a molar equivalent ratio of 1.0-10 based on the aromatic diol, and the surfactant may be used at a molar ratio of 1/10-1/50 based on the aromatic diol salt. Further, the interfacial polycondensation may be carried out at 25-135° C. for 2-12 hours.

To obtain an aqueous monomer solution containing an aromatic diol salt used for the interfacial polymerization, a predetermined amount of the above-described cardo based aromatic diol (or non-cardo based aromatic diol or a mixture thereof) is introduced to a preliminarily formed aqueous alkaline solution, and the resultant solution is agitated at about 30-50° C. for 10 minutes to 2 hours. Herein, the alkali concentration contained in the aqueous solution based on the aromatic diol depends on the chemical structure of the aromatic diol. However, it is preferred to adjust the concentration to about 1 to 15 equivalents. In addition, the alkali in the aqueous solution may be at least one selected from sodium hydroxide (NaOH), potassium hydroxide (KOH), potassium carbonate ($K_2CO_3$) and magnesium carbonate ($MgCO_3$).

Meanwhile, to carry out the interfacial polycondensation with the aqueous aromatic diol salt solution, a predetermined amount of diacyl chloride (SPOBAC) is dissolved into a nonpolar solvent immiscible with water to provide a monomer solution. Herein, as a solvent, it is possible to use at least one solvent selected from nonpolar solvents, including methylene chloride (MC), 1,2-dichloroethane (DCE), cyclohexane, n-hexane, n-heptane, benzene, toluene and chlorobenzene. In addition, it is preferred that the concentration of SPOBAC contained in the nonpolar solution is the same equivalent as the aromatic diol salt.

The novel aromatic polyester-based polymer is obtained by introducing the aqueous aromatic diol salt monomer solution and the aromatic diacyl chloride monomer solution in a nonpolar solvent at the same equivalent ratio, and carrying out polycondensation at the interface of the two solutions. Herein, to improve the miscibility of the solutions, a surfactant may be used and particular examples thereof include benzene tetraethylammonium trichloride (BTEAC), benzene tetraethylammonium bromide (BTEAB), tetraethylammonium chloride (TEAC), tetraoctylammonium bromide (TOAB) and tetradodecylammonium chloride (TDAC). Further, since the miscibility of the two solutions depends on the type and concentration of a surfactant and affects the molecular weight of the resultant polymer, selection of the type and concentration of a surfactant is important. Further, it is preferred that the interfacial polycondensation is carried out at a temperature of 25-135° C. for 30 minutes to 12 hours.

The examples and experiments will now be described. The following examples and experiment are for illustrative purposes only and not intended to limit the scope of this disclosure.

As used herein, the cardo based aromatic diol monomers of BPF (a'-1), 1,3-BPA (a'-2), 2,2-BPA (a'-3) and BPCH (a'-4) having the following structures are obtained by the method disclosed in Korean Patent Publication No. 10-128314 issued to the present inventors.

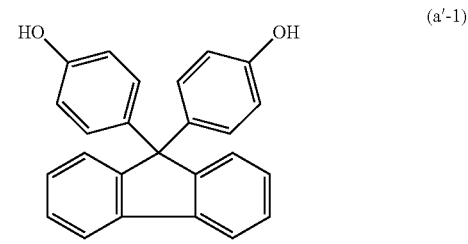
(a'-1)

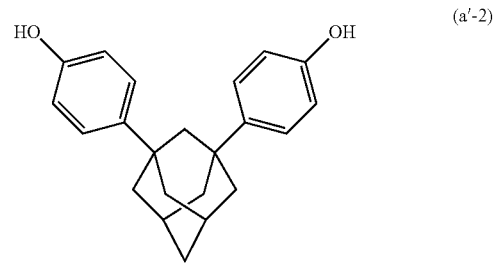
(a'-2)

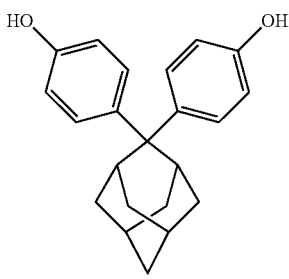

(a'-3)

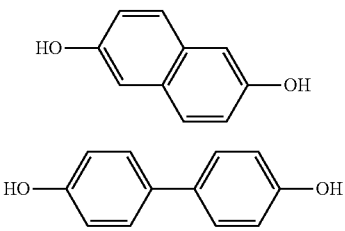

(b'-3)

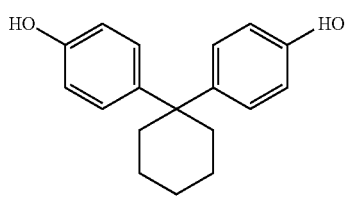

(b'-4)

Meanwhile, the aromatic diacylchloride monomer, SPO-BAC, is prepared first through the novel process disclosed in Example 3 hereinafter.

EXAMPLE 1

Preparation of Photo-crosslinkable Cardo Based Aromatic Diol Monomer SBAP 4,4'-sulfonyl bis(2-allylphenol) (SBAP) used as a photo-crosslinkable aromatic diol monomer herein is obtained through the two-step process as shown in the following Reaction formula 1.

In addition, SBAP (a'-5) and DHC (a'-6) having the following structures and used as photo-crosslinkable cardo based aromatic diol monomers are obtained by the methods disclosed in Examples 1 and 2 hereinafter.

[Reaction Formula 1]

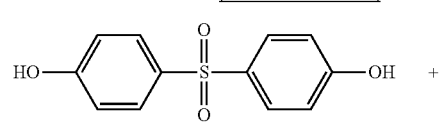

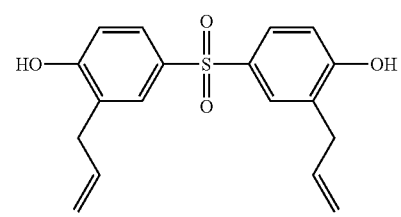

(a'-5)

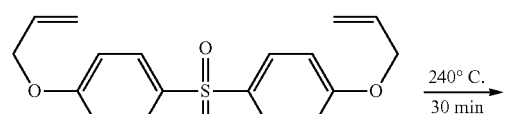

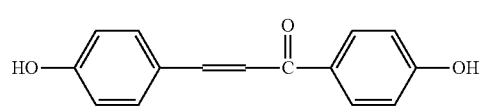

(a'-6)

Further, HQ (b'-1), 1,5-NPD (b'-2), 2,6-NPD (b'-3) and BP (b'-4) having the following structures and used as non-cardo based aromatic diol monomers are available from Aldrich Chemical Co. (USA) and used after purification.

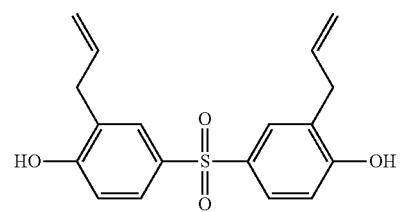

SBAP

(b'-1)

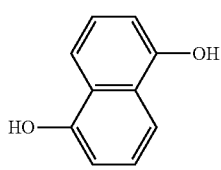

(b'-2)

(1) Under nitrogen atmosphere, 4,4'-sulfonyldiphenol (5 g, 20.0 mmole) is introduced and dissolved into DMF (25 mL). Next, $K_2CO_3$ (3.317 g, 24.0 mmole) is added thereto and the mixture is agitated at 80° C. for 30 minutes. Then, allyl bromide (4.154 mL, 48.0 mmole) is added, the reaction temperature is increased to 110° C. and a reaction is carried out for 8 hours. After the completion of the reaction, the reaction mixture is cooled to room temperature, precipitated in water (300 mL) and filtered to obtain a solid, which in turn is washed with ethanol to obtain pure 4,4'-sulfonylbis(allyloxybenzene) (SBAB) having the following structure. The resultant product has a yield and melting point of 60% and 144° C., respectively.

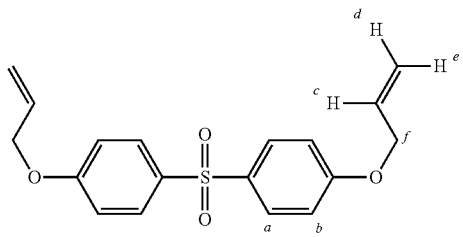 [SMILES: C=CCOc1ccc(S(=O)(=O)c2ccc(OCC=C)cc2)cc1]

$^1$H-NMR (CDCl$_3$, ppm): a, 7.83 (d, 4H); b, 6.96 (d, 4H); c, 6.01 (m, 2H); d, 5.40 (d, 2H); e, 5.31 (d, 2H); f, 4.57 (d, 4H).

(2) SBAB (10 g) obtained as described above is introduced to a flask and heated at 240° C. for 30 minutes under nitrogen atmosphere to cause Claisen rearrangement. Then, the resultant solid is recrystallized with toluene and washed with methylene chloride to obtain SBAP having the following structure. The resultant product has a yield and melting point of 30% and 152° C., respectively.

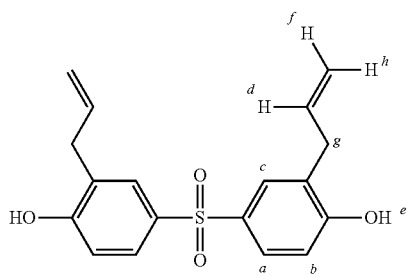 [SMILES: C=CCc1cc(S(=O)(=O)c2ccc(O)c(CC=C)c2)ccc1O]

$^1$H-NMR (CDCl$_3$, ppm): δ a,b, (complex, 4H); c, 6.87 (d, 2H); d, 5.96 (m, 2H); e, 5.50 (s, 2OH); f,h, 5.20 (complex, 4H); g 3.43 (d, 4H).

EXAMPLE 2

Preparation of Photo-crosslinkable Cardo Based Aromatic Diol Monomer DHC 4,4'-dihydroxychalcone (DHC) used as a photo-crosslinkable cardo based aromatic diol monomer herein is obtained through the process represented by the following Reaction Formula 2.

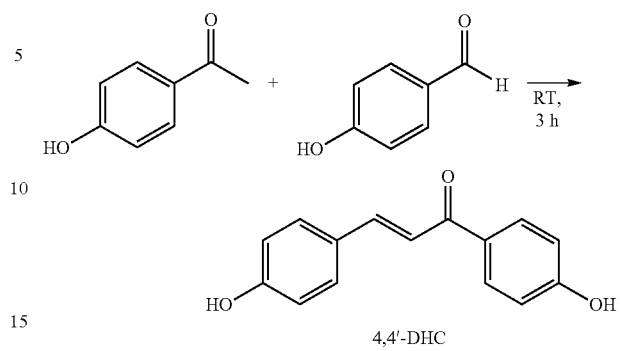

First, 4-hydroxybenzaldehyde (0.488 g, 4 mmole) and 4'-hyroxyacetophenone (0.66 g, 4.84 mmole) are introduced to a 25 mL flask and dissolved completely by adding 10 mL of diethyl ether and 4 mL of ethanol thereto. Next, 4 mL of sulfuric acid is introduced thereto and the reaction mixture is agitated for 3 hours. The reaction mixture is precipitated in water (300 mL) and filtered to obtain a solid, which in turn is washed with distilled water three times, dried under vacuum, and purified by column chromatography using diethyl ether/hexane (1/1, v/v) as eluent to obtain 4,4'-dihydroxychalcone (DHC) having the following structure. The resultant product has a yield and melting point of 30% and 203° C., respectively.

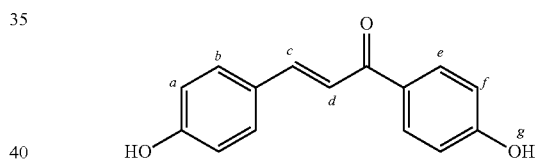

$^1$H NMR (DMSO-d6; ppm) g, 10.20(s, 2H); e, 8.04(d, 2H); c, 7.71(d, 1H); b, 7.67(d, 2H); f, 6.89(d, 2H); a, 6.83(d, 2H).

EXAMPLE 3

Preparation of Novel Aromatic Diacyl Chloride Monomer SPOBAC

The novel aromatic diacyl chloride monomer (4,4'-(4,4'-sulfonylbis(4,1-phenylene)bis(oxy))dibenzoic acid chloride (SPOBAC) used herein is obtained through the three-step process represented by the following Reaction Formula 3.

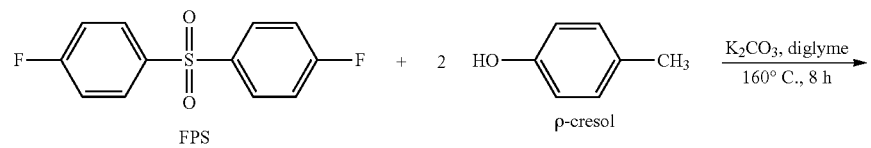

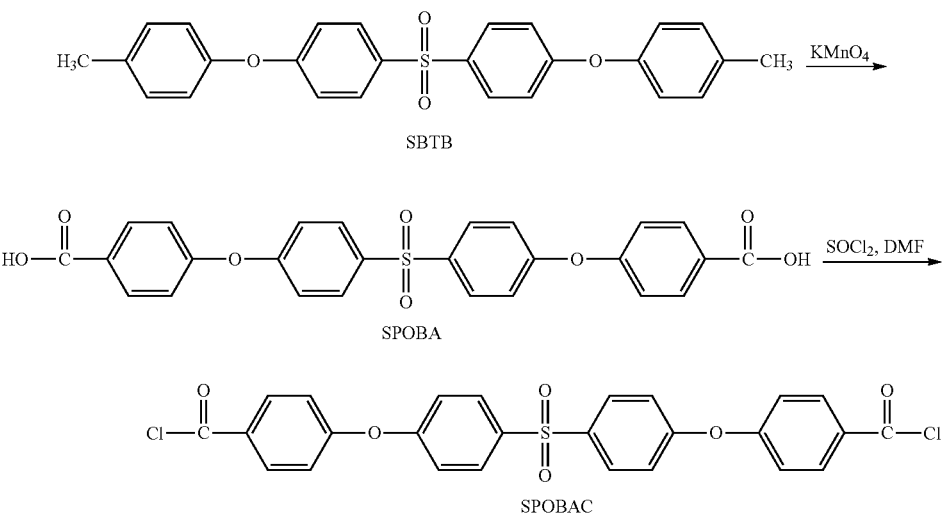

(1) Under nitrogen, 4,4'-difluorodiphenylsulfone (FPS, 9 g, 0.0354 mole) and p-cresol (11.259 mL, 0.106 mole) are introduced to a 250 mL three-neck flask and dissolved completely by adding 100 mL of diglyme thereto. Next, $K_2CO_3$ (7.7202 g, 0.0558 mole, 5 mole % excess) is further introduced, the temperature is increased to 160° C. and a reaction is carried out for 8 hours. After the completion of the reaction, the reaction mixture is cooled to room temperature and precipitated in distilled water (1 L) to obtain a solid, which, in turn is washed with ethanol twice and dried under vacuum to obtain pure 4,4'-sulfonylbis(p-tolyloxybenzene) (SBTB) having the following structure. The resultant product has a yield and melting point of 85% and 136° C., respectively.

solvent from the filtered solution, NaOH (5.568 g, 0.139 mole) and water (155 mL) are added so that the solid is dissolved completely. Then, $KMnO_4$ (14.68 g, 92.89 mmole) is further added thereto and the reaction mixture is agitated at 110° C. for 10 hours. Then, the solution is cooled to a temperature of 70° C., ethanol (3.9 mL) is added thereto and the mixture is further agitated for 1 hour to decompose the unreacted $KMnO_4$. The reaction solution is filtered while it is hot, and the filtered solution is precipitated in water at pH 2 to obtain a solid. The solid is washed with pure water several to obtain pure SPOBA (4,4'-(4,4'-sulfonylbis(4,1-phenylene)

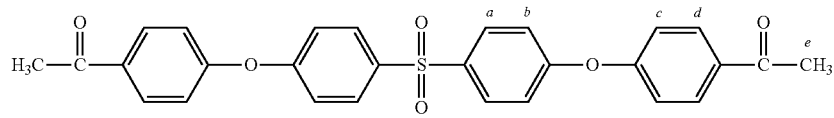

$^1$H-NMR (DMSO-d6, ppm): a, 7.89 (d, 4H); b, 7.26 (d, 4H); c, 7.06 (d, 4H); d, 7.03 (d, 4H); e, 2.32 (s, 6H).

(2) To a 250 mL three-neck flask, SBTB (5 g, 11.61 mmole), $KMnO_4$ (14.68 g, 92.89 mmole), pyridine (125 mL) and water (50 mL) are introduced and dissolved. Next, the temperature is increased to 110° C., and the reaction mixture is agitated for 10 hours and filtered while it is hot to remove the resultant $MnO_2$. To the solid obtained by evaporating the times to remove a trace amount of acid contained therein, further washed with methanol twice, and dried under vacuum bis(oxy))dibenzoic acid having the following structure. The resultant product has a yield and melting point of 50% and 298° C., respectively.

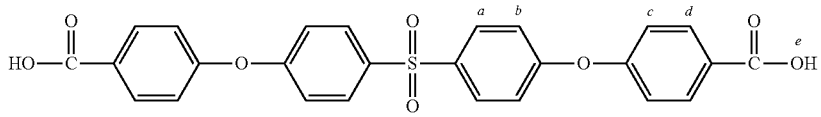

$^1$H-NMR (DMSO-d6, ppm): e, 13.00 (s, 2OH); a, 8.00 (d, 4H); d, 7.99 (d, 4H); b, 7.25 (d, 4H); c, 7.20 (d, 4H).

(3) To a 50 mL three-neck flask, SPOBA (0.4905 g, 1 mmole) and DMF (2 mL) are introduced and agitated for 1 hour so that SPOBA is dissolved completely. Next, thionyl chloride (20 mL, 0.276 mole) is added to the resultant solution and agitated at 80° C. for 5 hours. The temperature is decreased to room temperature, and then DMF as a solvent and unreacted thionyl chloride are removed by using a rotary evaporator. Then, the precipitated solid is washed with 150 mL of distilled water three times. Then, the filtered precipitated is vacuum-dried under at 80° C. for 24 hours to obtain crude SPOBAC as a solid. The solid is introduced to 150 mL of ethanol, agitated for 4 hours, filtered and dried under vacuum for 24 hours to obtain pure SPOBAC having the following structure. The resultant product has a yield and melting point of 78% and 187° C., respectively.

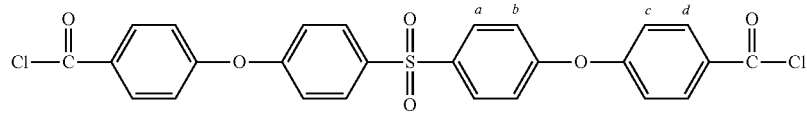

$^1$H-NMR (DMSO-d6, ppm): a 8.00 (d, 4H); d 7.99 (d, 4H); b 7.25 (d, 4H); c 7.20 (d, 4H).

EXAMPLE 4

Preparation of Novel Aromatic Polyester-based Polymer (P-1)

Under nitrogen atmosphere, BPF (0.332 g, 0.948 mmole) obtained by the method disclosed in Examples of Korean Patent Publication No. 10-1208314 issued to the present inventors and used as a cardo based aromatic diol and 10 mL of 1M aqueous NaOH solution are added to a 50 mL two-neck flask, and agitated at 50° C. for 1 hour to dissolve the aromatic diol completely. To the resultant aqueous solution, benzyl triethyl ammonium chloride (BTEAC, 5.7 mg) is introduced as a surfactant and the resultant mixture is further agitated for 1 hour to obtain an aqueous aromatic diol salt solution. To the resultant solution, 1,2-dichloroethane (DCE) (20 mL) as an organic solvent in which the novel aromatic diacyl chloride monomer SPOBAC (0.5 g, 0.948 mmole) is dissolved is introduced gradually for 5 minutes. Then, the temperature is increased to 60° C. and the reacation mixture is agitated for 3 hours to carry out polycondensation at the interface between the two solvents. After the completion of the interfacial polycondensation, the polymerized solution is added gradually to 500 mL of hot water to cause the precipitation of polymer. After the precipitated polymer is filtered, it is further washed with an excessive amount of hot water three times, followed by filtering and drying in a vacuum oven. After the drying, the polymer is dissolved again in chloroform solvent (20 mL) and reprecipitated in an excessive amount of methanol. The resultant polymer is introduced to a soxhlet extractor and refluxed in acetone solvent at 80° C. for 48 hours to remove the unreacted monomer and low-molecular weight polymer dissolved in acetone. The remaining white solid is dried in a vacuum oven to obtain a novel aromatic polyester-based poly (BPF/SPOBAC) polymer (P-1) having the following structure. The resultant polymer has a conversion ratio of 62%, a number average molecular weight (Mn) of 36300, a molecular weight distribution of 1.77 and a glass transition temperature (Tg) of 284° C.

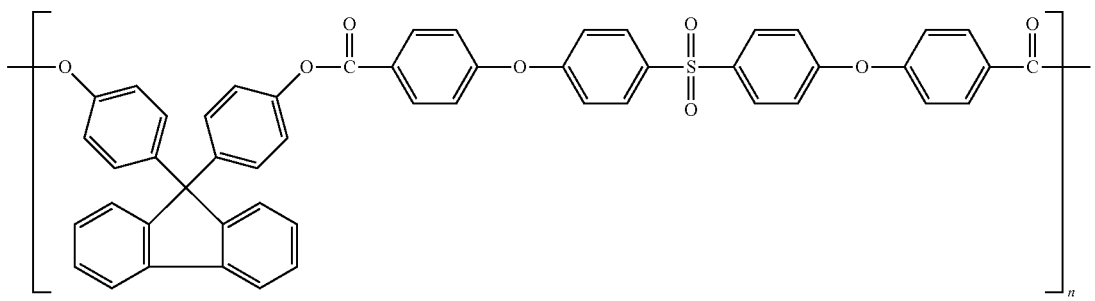

EXAMPLE 5

Preparation of Novel Aromatic Polyester-based Polymer (P-2)

Interfacial polycondensation and post-treatment procedure are carried out in the same manner as Example 4 to obtain a pure novel aromatic polyester-based poly(1,3-BPA-SPO-BAC) polymer (P-2), except that 1,3-BPA (0.304 g, 0.948 mmole) is added as a cardo based aromatic diol instead of BPF. The resultant polymer has a conversion ratio of 60%, a number average molecular weight (Mn) of 31100, a molecular weight distribution of 1.46 and a glass transition temperature (Tg) of 248° C.

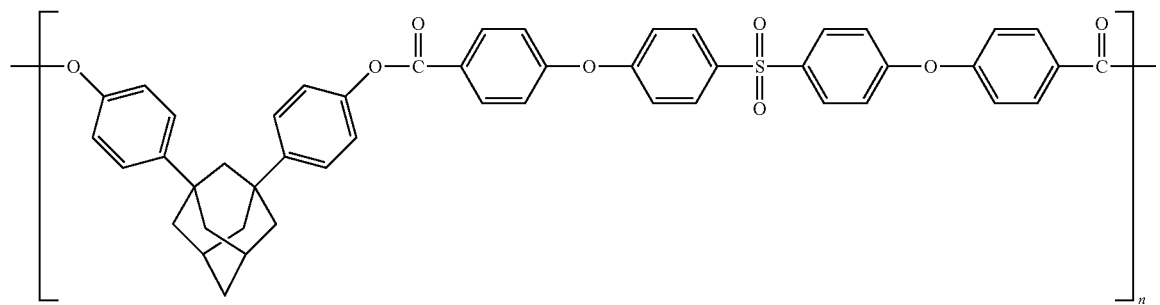

EXAMPLE 6

Preparation of Novel Aromatic Polyester-based Polymer (P-3)

Interfacial polycondensation and post-treatment procedure are carried out in the same manner as Example 4 to obtain a pure novel aromatic polyester-based poly(2,2-BPA-SPO-BAC) polymer (P-3), except that 2,2-BPA (0.304 g, 0.948 mmole) is added as a cardo based aromatic diol instead of BPF. The resultant polymer has a conversion ratio of 60%, a number average molecular weight (Mn) of 29500, a molecular weight distribution of 1.40 and a glass transition temperature (Tg) of 273° C.

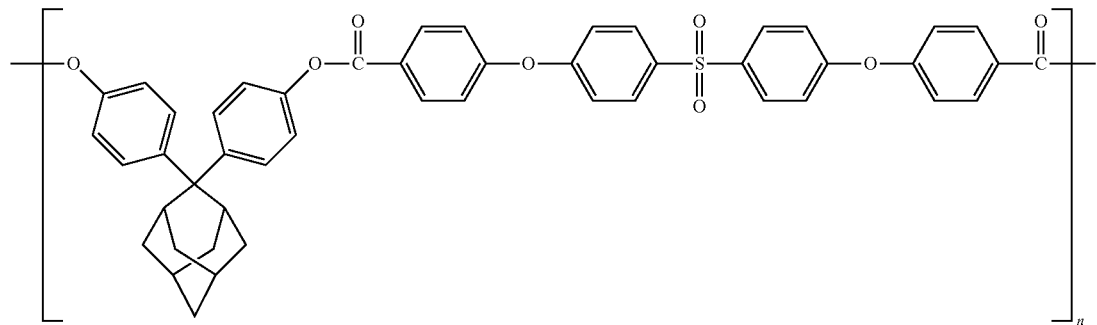

EXAMPLE 7

Preparation of Novel Aromatic Polyester-based Polymer (P-4)

Interfacial polycondensation and post-treatment procedure are carried out in the same manner as Example 4 to obtain a pure novel aromatic polyester-based poly(BHPC-SPOBAC) polymer (P-4), except that BHPC (0.254 g, 0.948 mmole) is added as a cardo based aromatic diol instead of BPF. The resultant polymer has a conversion ratio of 40%, a number average molecular weight (Mn) of 23900, a molecular weight distribution of 1.41 and a glass transition temperature (Tg) of 233° C.

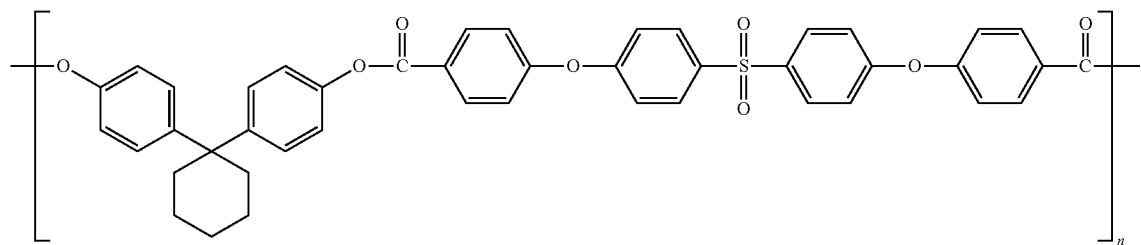

EXAMPLE 8

Preparation of Novel Aromatic Polyester-based Polymer (P-5)

Interfacial polycondensation and post-treatment procedure are carried out in the same manner as Example 4 to obtain a pure novel aromatic polyester-based poly(0.9-BPF-0.1-BP/SPOBAC) polymer (P-5), except that mixed monomers of BPF/BF=9/1 (molar ratio) are added as cardo based aromatic diols instead of BPF, the mixed monomers and SPOBAC are added at a molar ratio of 1/1 (mixed monomers/SPOBAC), and methylene chloride (MC) is used as an organic solvent instead of DCE. The resultant polymer has a conversion ratio of 73%, a number average molecular weight (Mn) of 22300, a molecular weight distribution of 2.67 and a glass transition temperature (Tg) of 270° C.

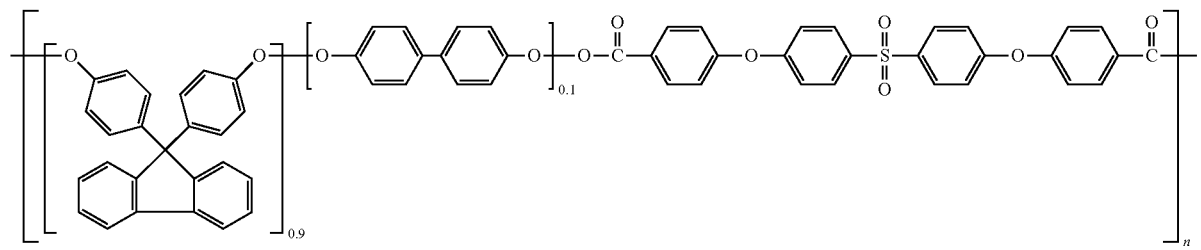

EXAMPLE 9

Preparation of Novel Aromatic Polyester-based Polymer (P-6)

Interfacial polycondensation and post-treatment procedure are carried out in the same manner as Example 4 to obtain a pure novel aromatic polyester-based poly(0.8-BPF-0.2-1,3-BPA/SPOBAC) polymer (P-6), except that mixed monomers of BPF/1,3-BPA=4/1 (molar ratio) are added as cardo based aromatic diols instead of BPF, and the mixed monomers and SPOBAC are added at a molar ratio of 1/1 (mixed monomers/SPOBAC). The resultant polymer has a conversion ratio of 58%, a number average molecular weight (Mn) of 23600, a molecular weight distribution of 1.47 and a glass transition temperature (Tg) of 281° C.

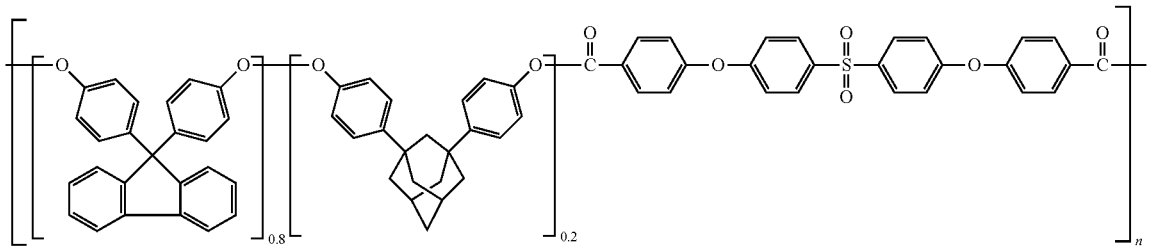

EXAMPLE 10

Preparation of Novel Aromatic Polyester-based Polymer (P-7)

Interfacial polycondensation and post-treatment procedure are carried out in the same manner as Example 4 to obtain a pure novel aromatic polyester-based poly(0.8-BPF-0.15-1,3-BPA-0.05-SBAP/SPOBAC) polymer (P-7), except that mixed monomers of BPF/1,3-BPA/SBAP=16/3/1 (molar ratio) are added as cardo based aromatic diols instead of BPF, the mixed monomers and SPOBAC are added at a molar ratio of 1/1 (mixed monomers/SPOBAC), and MC is used as an organic solvent instead of DCE. The resultant polymer has a conversion ratio of 62%, a number average molecular weight (Mn) of 26500, a molecular weight distribution of 1.89 and a glass transition temperature (Tg) of 270° C.

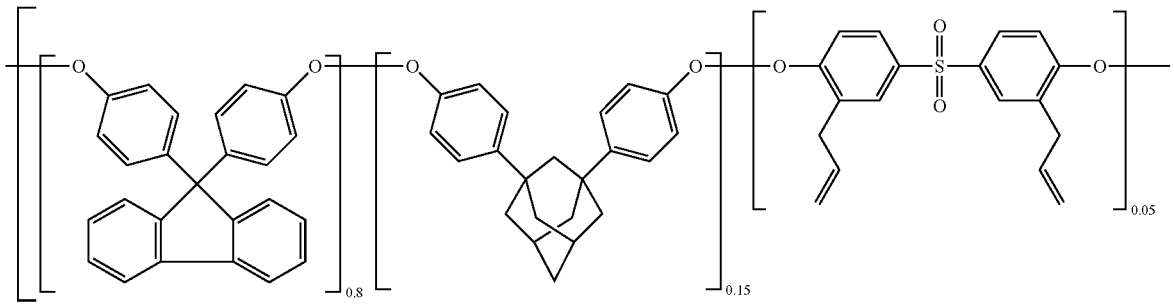

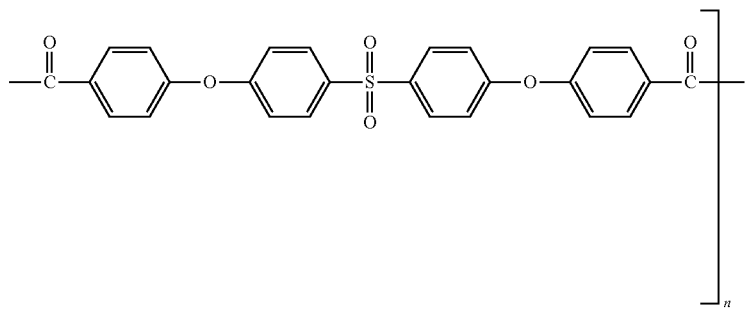

EXAMPLE 11

Preparation of Novel Aromatic Polyester-based Polymer (P-8)

Interfacial polycondensation and post-treatment procedure are carried out in the same manner as Example 4 to obtain a pure novel aromatic polyester-based poly(0.8-BPF-0.15-1,3-BPA-0.05-DHC/SPOBAC) polymer (P-8), except that mixed monomers of BPF/1,3-BPA/DHC=16/3/1 (molar ratio) are added as cardo based aromatic diols instead of BPF, the mixed monomers and SPOBAC are added at a molar ratio of 1/1 (mixed monomers/SPOBAC), and MC is used as an organic solvent instead of DCE. The resultant polymer has a conversion ratio of 75%, a number average molecular weight (Mn) of 20200, a molecular weight distribution of 2.02 and a glass transition temperature (Tg) of 265° C.

EXAMPLE 12

Preparation of Novel Aromatic Polyester-based Polymer (P-9)

Interfacial polycondensation and post-treatment procedure are carried out in the same manner as Example 4 to obtain a pure novel aromatic polyester-based poly(0.8-BPF-0.15-2,-BPA-0.05-SBAP/SPOBAC) polymer (P-9), except that mixed monomers of BPF/2,2-BPA/DHC=16/3/1 (molar ratio) are added as cardo based aromatic diols instead of BPF, the mixed monomer and SPOBAC are added at a molar ratio of 1/1 (mixed monomers/SPOBAC), and MC is used as an organic solvent instead of DCE. The resultant polymer has a conversion ratio of 70%, a number average molecular weight (Mn) of 59300, a molecular weight distribution of 1.76 and a glass transition temperature (Tg) of 273° C.

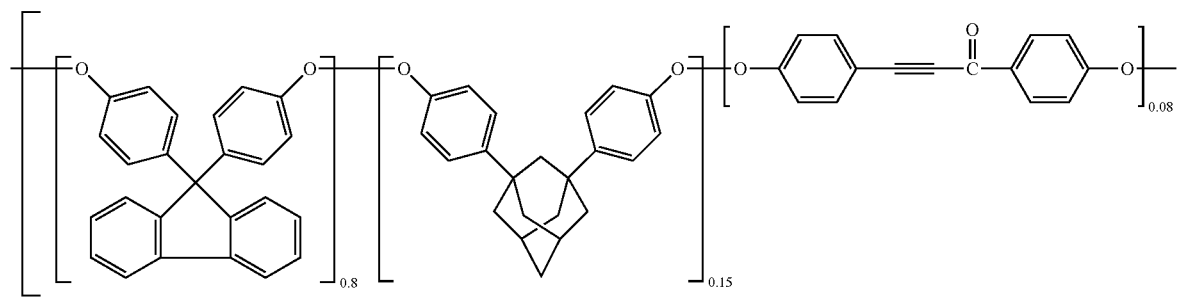

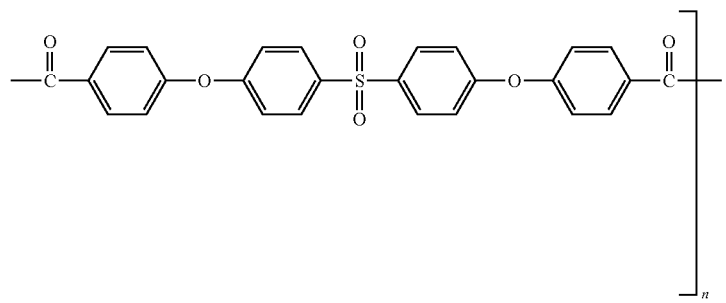

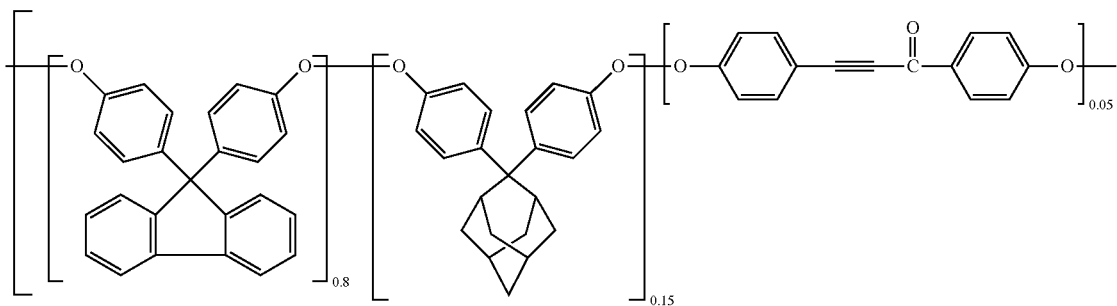

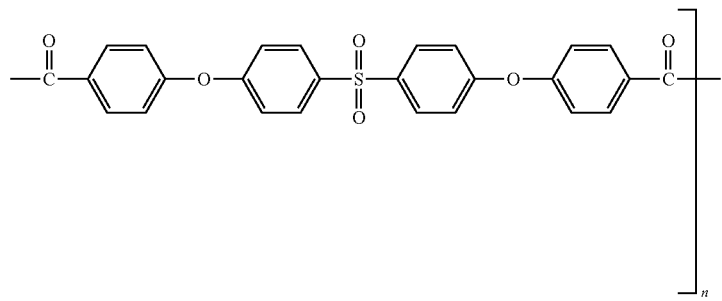

EXAMPLE 13

Preparation of Novel Aromatic Polyester-based Polymer (P-10)

Interfacial polycondensation and post-treatment procedure are carried out in the same manner as Example 4 to obtain a pure novel aromatic polyester-based poly(1,5-NPD-SPO-BAC) polymer (P-10), except that 1,5-NPD (0.152 g, 0.948 mmole) is added as a non-aromatic diol instead of BPF, and MC is used as an organic solvent instead of DCE. The resultant polymer is a crystalline polymer and is precipitated during the polymerization. In addition, since the polymer is not soluble in a general solvent such as THF, DMF or chloroform, it is not possible to measure the molecular weight thereof. The resultant polymer has a conversion ratio of 50% and a glass transition temperature (Tg) of 160° C.

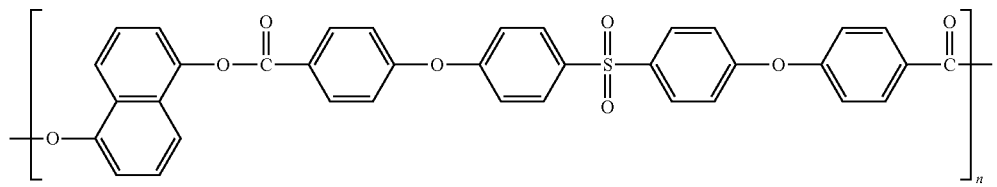

EXAMPLE 14

Preparation of Novel Aromatic Polyester-based Polymer (P-11)

Interfacial polycondensation and post-treatment procedure are carried out in the same manner as Example 4 to obtain a pure novel aromatic polyester-based poly(BP-SPOBAC) polymer (P-11), except that BP (0.177 g, 0.948 mmole) is added as a non-aromatic diol instead of BPF, and MC is used as an organic solvent instead of DCE. The resultant polymer is a crystalline polymer and is precipitated during the polymerization. In addition, since the polymer is not soluble in a general solvent such as THF, DMF or chloroform, it is not possible to measure the molecular weight thereof. The resultant polymer has a conversion ratio of 48% and a glass transition temperature (Tg) of 253° C.

EXAMPLE 17

Preparation of Novel Aromatic Polyester-based Polymer (P-1) Using Different Solvent Interfacial polycondensation and post-treatment procedure are carried out in the same manner as Example 4 to obtain the above-mentioned novel aromatic polyester-based poly(BPF-SPOBAC) polymer (P-1), except that chlorobenzene is used as an organic solvent instead of DCE. The resultant polymer has a conversion ratio of 88%, a number average molecular weight (Mn) of 4600, a molecular weight distribution of 2.20 and a glass transition temperature (Tg) of 224° C.

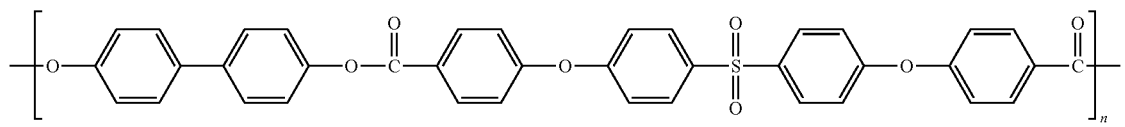

EXAMPLE 15

Preparation of Novel Aromatic Polyester-based Polymer (P-12)

Interfacial polycondensation and post-treatment procedure are carried out in the same manner as Example 4 to obtain a pure novel aromatic polyester-based poly(2,6-NPD-SPOBAC) polymer (P-12), except that 2,6-NPD (0.152 g, 0.948 mmole) is added as a non-aromatic diol instead of BPF, and MC is used as an organic solvent instead of DCE. The resultant polymer is a crystalline polymer and is precipitated during the polymerization. In addition, since the polymer is not soluble in a general solvent such as THF, DMF or chloroform, it is not possible to measure the molecular weight thereof. The resultant polymer has a conversion ratio of 38% and a glass transition temperature (Tg) of 142° C.

EXAMPLE 16

Preparation of Novel Aromatic Polyester-based Polymer (P-1) Using Different Surfactant Interfacial polycondensation and post-treatment procedure are carried out in the same manner as Example 4 to obtain the above-mentioned novel aromatic polyester-based poly(BPF-SPOBAC) polymer (P-1), except that TEAC is used as a surfactant instead of BTEAC. The resultant polymer has a conversion ratio of 76%, a number average molecular weight (Mn) of 39200, a molecular weight distribution of 1.66 and a glass transition temperature (Tg) of 283° C.

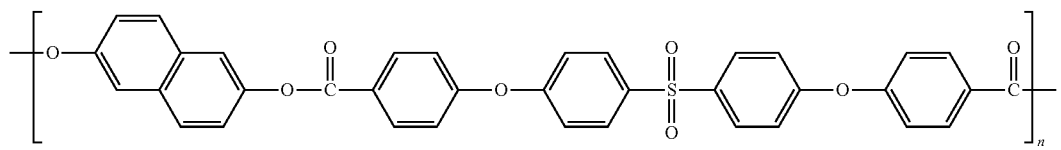

EXAMPLE 16

Preparation of Novel Aromatic Polyester-based Polymer (P-1) Using Different Solvent Interfacial polycondensation and post-treatment procedure are carried out in the same manner as Example 4 to obtain the above-mentioned novel aromatic polyester-based poly(BPF-SPOBAC) polymer (P-1), except that MC is used as an organic solvent instead of DCE. The resultant polymer has a conversion ratio of 82%, a number average molecular weight (Mn) of 56000, a molecular weight distribution of 1.91 and a glass transition temperature (Tg) of 284° C.

EXAMPLE 19

Preparation of Novel Aromatic Polyester-based Polymer (P-1) Using Different Alkali Interfacial polycondensation and post-treatment procedure are carried out in the same manner as Example 4 to obtain the above-mentioned novel aromatic polyester-based poly(BPF-SPOBAC) polymer (P-1), except that 1M aqueous potassium carbonate ($K_2CO_3$) solution (10 mL) is used to form an aromatic diol salt instead of NaOH. The resultant polymer has a conversion ratio of 84%, a number average molecular weight (Mn) of 43200, a molecular weight distribution of 1.58 and a glass transition temperature (Tg) of 284° C.

EXAMPLE 20

Preparation of Novel Aromatic Polyester-based Polymer (P-1) Using Different Polymerization Time Interfacial polycondensation and post-treatment procedure are carried out in the same manner as Example 4 to obtain the above-mentioned novel aromatic polyester-based poly(BPF-SPOBAC) polymer (P-1), except that interfacial polymerization is carried out for 24 hours. The resultant polymer has a conversion ratio of 92%, a number average molecular weight (Mn) of 42800, a molecular weight distribution of 1.63 and a glass transition temperature (Tg) of 284° C.

TEST EXAMPLE

Analysis of Characteristics and Physical Properties of Polymers

In the novel aromatic polyester-based polymers obtained under the above-described reaction conditions and having excellent transparency in combination with high heat resistance, the molecular weights and molecular weight distributions, thermal phase transition temperatures and stabilities, and tensile properties of polymer films are determined by the following methods. In addition, each of the novel aromatic polyester-based polymers is dissolved in chloroform as a solvent at a concentration of 4-10 wt %, and then is formed into a polymer film with a thickness of 40-100 μm by using a solvent casting process. The film thickness depends on the concentration of polymer solution.

Determination of Molecular Weight of Polymer

The number average molecular weight (Mn), weight average molecular weight (Mw) and molecular weight distribution (Mw/Mn) of a polymer product are determined by measuring the relative molecular weight based on the absolute molecular weight of a standard polystyrene sample by using Gel Permeation Chromatography (GPC) in THF as a solvent.

Determination of Thermal Phase Transition Temperature

The melting point (Tm) and glass transition temperature (Tg) of a monomer and polymer are determined at a constant heating rate (20° C./min) under nitrogen atmosphere by using differential scanning calorimeter (DSC).

Analysis of Thermal Stability

The thermal stability of a polymer, including 1.0% decomposition temperature (initial decomposition temperature), 5%, 20% and 50% decomposition temperatures, or char yield (%) remaining at 600° C. without decomposition, is determined at a constant heating rate (20° C./min) under nitrogen atmosphere by using thermal gravimetric analyzer (TGA).

Determination of Transparency

The transparency of a novel aromatic polyester-based polymer film having a predetermined thickness (50-60 μm) and obtained by the above-mentioned solvent casting process is determined by using a UV-Vis spectrophotometer in a wavelength range of 400-800 nm.

Determination of Mechanical Properties

A predetermined size (0.5×7.0 cm) of each novel polyester-based polymer film (thickness: 50-60 μm) is determined for its stress-strain curve under the same condition (crosshead speed: 10 mm/min) by using the Instron tester (ASTM-D882 method). Then, several mechanical properties, such as modulus (MPa), elongation at break (%) and tensile strength (MPa) of each polymer film are calculated. Referring to the tensile property, three of the same films are determined under the same condition and the average thereof is regarded as the value of mechanical property of the novel polymer.

The following Table 1, Table 2 and Table 3 show the glass transition temperature (Tg) and thermal stability, transparency and mechanical properties of typical polymers selected from the novel aromatic polyester-based polymers disclosed herein. In other words, the results show the characteristics of the novel aromatic polyester-based polymers showing high transparency in combination with excellent heat resistance, as demonstrated by a glass transition temperature (Tg) of 233-284° C., initial decomposition temperature of 370-440° C., 20% decomposition temperature of 480-535° C., and a transparency of at least 84% at a wavelength of 550 nm.

Figure 2:
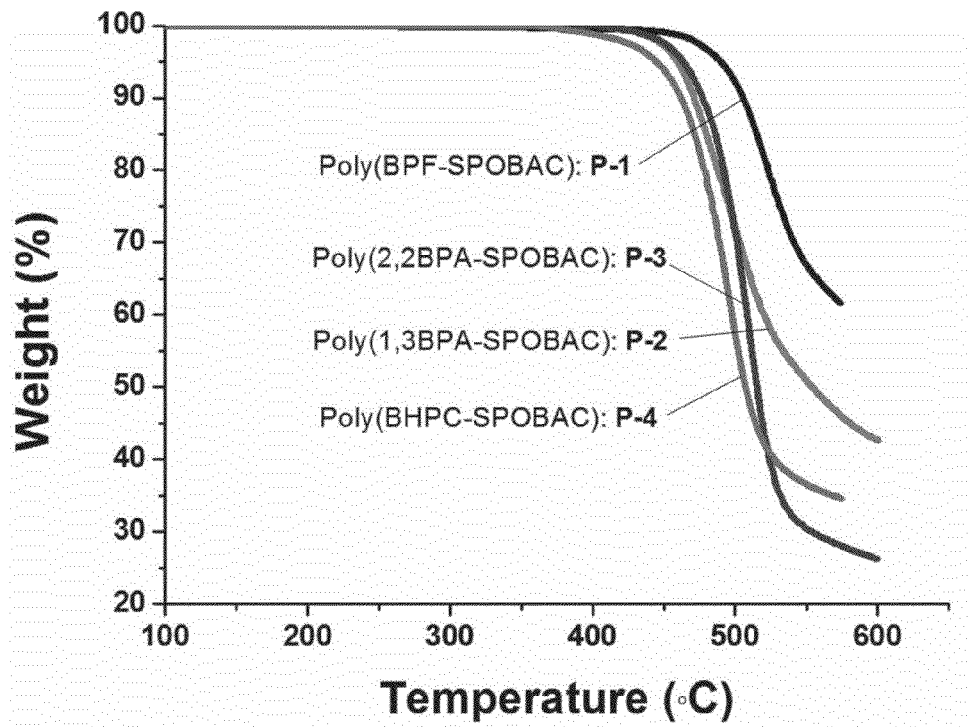
FIG. 2 is a graph illustrating the Thermogravimetric Analysis (TGA) curves of the polyester-based polymers (P-1 to P-4) obtained from Examples 4 to 7.
Figure 3:
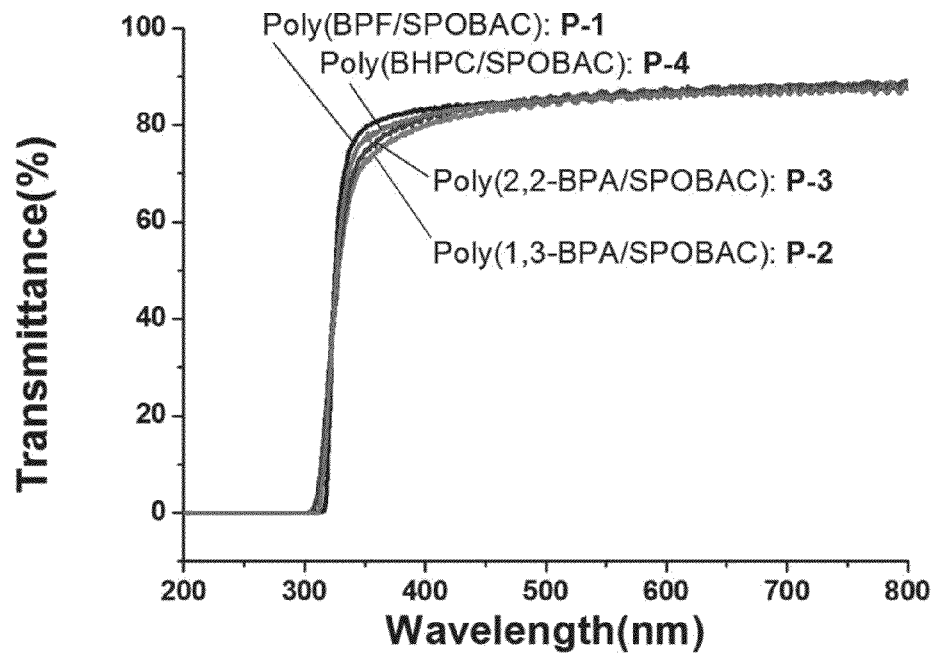
FIG. 3 shows UV-Vis spectra of the films including the polyester-based polymers (P-1 to P-4) obtained from Examples 4 to 7.
Figure 4:
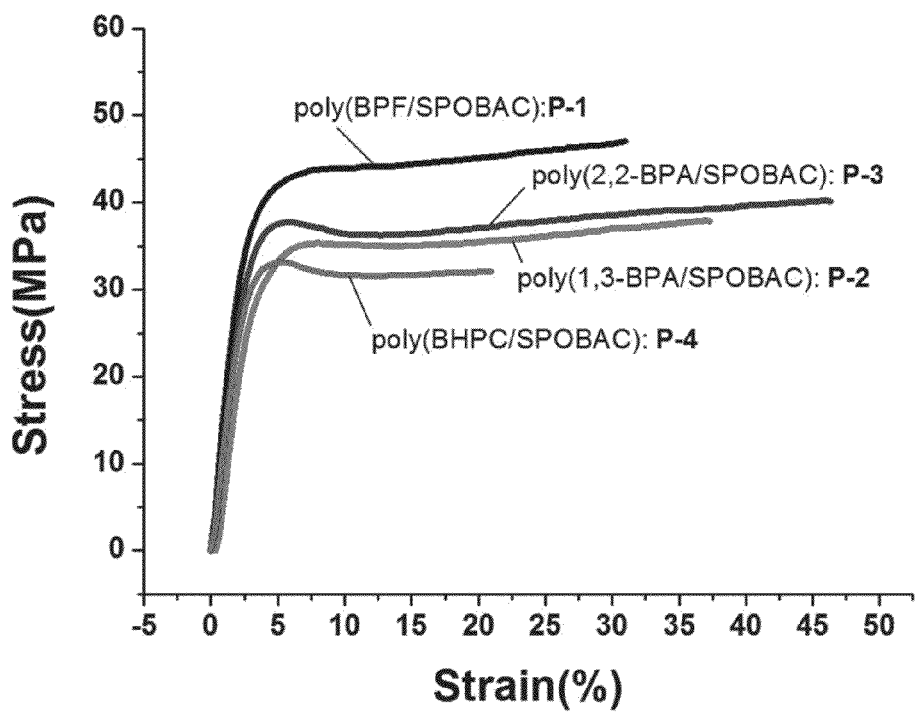
FIG. 4 is a graph illustrating the stress-strain curves of the films including the polyester-based polymers (P-1 to P-4) obtained from Examples 4 to 7.

FIG. 1, FIG. 2, FIG. 3 and FIG. 4 show the typical DSC thermal curve, TGA thermal curve, UV-Vis spectrum and stress-strain curve of some polymers selected from the novel aromatic polyester-based polymers disclosed herein, the curves illustrating the glass transition temperature (Tg), decomposition temperature and char amount, transparency, and mechanical properties (modulus, tensile strength and elongation), respectively.

Table 1 shows the glass transition temperatures and thermal stabilities of the aromatic polyester-based polymers disclosed herein.

TABLE 1

|  | Polymer sample | Glass transition temperature ($T_g$) | $T_{id}^a$ | $T_{10}^a$ | $T_{20}^a$ | $T_{50}^a$ | Char amount (%)[b] |
|---|---|---|---|---|---|---|---|
| Ex. 4 | P-1 | 284 | 440 | 505 | 530 | — | 61 |
| Ex. 5 | P-2 | 248 | 398 | 470 | 487 | 553 | 43 |
| Ex. 6 | P-3 | 273 | 404 | 477 | 491 | 515 | 26 |
| Ex. 7 | P-4 | 233 | 370 | 465 | 480 | 515 | 35 |
| Ex. 8 | P-5 | 270 | 430 | 508 | 535 | 696 | 60 |
| Ex. 9 | P-6 | 281 | 400 | 501 | 528 | 606 | 51 |
| Ex. 10 | P-7 | 270 | 390 | 458 | 512 | 618 | 52 |
| Ex. 11 | P-8 | 265 | 385 | 482 | 511 | 597 | 49 |

[a]$T_{id}$, $T_{10}$, $T_{20}$, $T_{50}$: each means the temperature where 1.0%, 10%, 20% and 50% of polymer is decomposed and represents the thermal stability of polymer.

[b] Char amount (%): each value means the amount of polymer char remaining after heating to 600° C. under nitrogen atmosphere.

As shown in Table 1, the polymer according to the present invention has a high glass transition temperature of 233-284° C. In general, the strong rigidity of a polymer backbone inhibits the rotation thereof, resulting in an increase in glass transition temperature. Among the polymers according to the present invention, P-1 of Example 4 is derived from a fluorene-containing cardo based monomer and shows high rigidity and the highest Tg. P-4 of Example 7 containing a cardo based cyclohexane type monomer shows a glass transition temperature of 233° C., and P-5 of Example 8 containing a non-cardo based monomer shows a glass transition temperature of 248° C. Both polymers have a relatively low Tg as compared to the other polymers. This is because both polymers have an increased free volume as compared to the other polymers, and thus allow easy rotation of a polymer chain. In addition, to determine the thermal stabilities of the polymers according to the present invention, the initial decomposition temperature (temperature where the weight of polymer is decreased by 1%) is measured by using a TGA instrument. It can be seen from an initial decomposition temperature of 370-440° C. that the polymers have excellent thermal stabilities.

Table 2 shows the transparency (transmittance) of each of the aromatic polyester-based polymers according to the present invention.

TABLE 2

| | Polymer sample | Transmittance (%) 400 nm | Transmittance (%) 550 nm |
|---|---|---|---|
| Ex. 4 | P-1 | 79 | 85 |
| Ex. 5 | P-2 | 79 | 85 |
| Ex. 6 | P-3 | 81 | 86 |
| Ex. 7 | P-4 | 82 | 87 |
| Ex. 8 | P-5 | 78 | 84 |
| Ex. 9 | P-6 | 80 | 85 |
| Ex. 10 | P-7 | 79 | 84 |
| Ex. 11 | P-8 | 83 | 89 |

As shown in Table 2, after the transparency of each polymer film according to the present invention is determined by using a UV-Vis spectrometer, each polymer film shows a high transmittance of 84-89% at 550 nm.

In addition, although the polymers according to the present invention have a high Tg and thermal stabilities, they show excellent film formability and a high transmittance. It is thought that cardo based monomers having a large number of aromatic rings show a high diffraction index and high heat resistance and each aromatic ring is oriented toward a different direction, and thus such monomers neglect optical anisotropy and show high transmittance. In the case of P-5 film of Example 8, it shows a transmittance of about 78% at 400 nm. It shows a relatively low transmittance as compared to the other polymers. This is because π-π stacking occurs between aromatic groups of BP and SPOBAC used as monomers.

Table 3 shows the mechanical properties of the aromatic polyester-based polymer films according to the present invention.

TABLE 3

| | Polymer sample | Modulus (Mpa) | Tensile strength (Mpa) | Elongation at break (%) |
|---|---|---|---|---|
| Ex. 4 | P-1 | 2352 | 47.01 | 31 |
| Ex. 5 | P-2 | 1859 | 37.93 | 37 |
| Ex. 6 | P-3 | 2071 | 40.22 | 46 |
| Ex. 7 | P-4 | 1831 | 33.16 | 21 |
| Ex. 8 | P-5 | 2011 | 47.43 | 31 |
| Ex. 9 | P-6 | 2397 | 56.13 | 24 |
| Ex. 10 | P-7 | 1929 | 41.67 | 42 |
| Ex. 11 | P-8 | 1959 | 40.32 | 40 |

As shown in Table 3, after determining the mechanical properties of the polymers according to the present invention, the polymers show a modulus of 1831-2397 MPa, and P-1 of Example 4 obtained by using BPF and SPOBAC at a ratio of 1:1 show a modulus and tensile strength of 2352 MPa and 47 Mpa, respectively. In addition, P-3 of Example 6 obtained by using 1,3-BPA and SPOBAC at a ratio of 1:1 show a modulus and tensile strength of 1859 MPa and 37 MPa, respectively. Meanwhile, P-6 of Example 9 obtained by using BPF, 1,3-BPA and SPOBAC at a ratio of 0.8:0.2:1 show the highest mechanical modulus and strength of 2397 MPa and 56 MPa, respectively. Meanwhile, when using a photo-crosslinking agent, SBAP or DHC is used in an amount of 5 mol % (P-7 or P-8), the modulus and tensile strength are slightly lower as compared to P-6, but the strain is increased by about 2 times.

In general, the heat resistance of a polymer is in an inversely proportional relationship with the transparency thereof. Therefore, to compensate for such opposite characteristics with each other, a novel aromatic diol monomer in which a fluorene or admantane group is introduced at the center and aromatic groups are introduced symmetrically around the center, a photo-crosslinkable diol monomer, and novel aromatic diacyl chloride SPOBAC monomers in which flexible sulfone/ether groups are introduced alternately between aromatic groups are prepared, and the polyester-based polymer according to the present invention is obtained from the above-mentioned monomers. The thus obtained polyester-based polymer shows improved transparency by virtue of the novel aromatic diol having an adamantane or fluorene group with a predetermined free volume, as well as enhances heat resistant property by forming a crystalline microstructure in the polymer chain from the aromatic diacyl chloride having flexible sulfone/ether groups introduced continuously between benzene groups. In other words, according to the present invention, the aromatic diacyl chloride monomer SPOBAC and the aromatic diol monomer BPF, 1,3-BPA, 2,2-BPA, BHPC or photo-crosslinkable diol monomer SBAP, DHC or a mixture thereof are subjected to interfacial polycondensation in the presence of BTEAC as a catalyst to obtain a novel aromatic polyester polymer.

Therefore, it is possible to obtain a novel aromatic polyester having high transparency and heat resistance by introducing fluorene having high heat resistance and admantane or cyclohexane groups capable of reducing the free volume between polymer chains into a gap between bulky fluorene groups located vertically to polymer chains.

As can be seen from the foregoing, the novel polyester according to the present invention, which has high transparency in combination with excellent heat resistance, may be applied to a flexible plastic substrate material for use in next-generation displays, solar cells or electronic paper.

While the present invention has been described with respect to the specific embodiments, it will be apparent to those skilled in the art that various changes and modifications may be made without departing from the spirit and scope of the invention as defined in the following claims.

What is claimed is:

1. An aromatic polyester-based polymer, comprising a repeating unit represented by formula (I) and comprising at least one aromatic diol monomer:

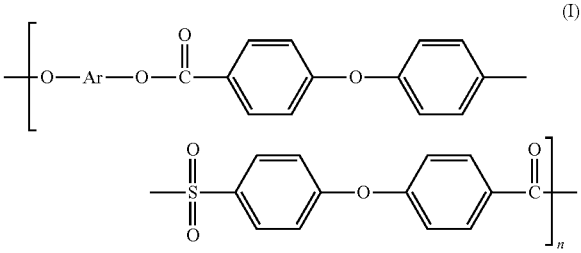

wherein Ar is a substituted or non-substituted $C_6$-$C_{40}$ aromatic cyclic group, and wherein *—O—Ar—O—* is a diphenoxy structure derived from at least one of the following formulae:

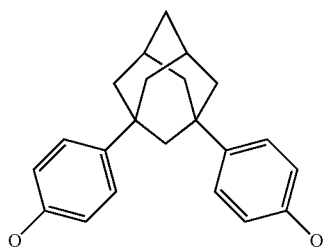
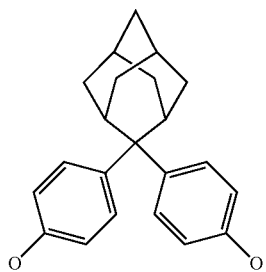
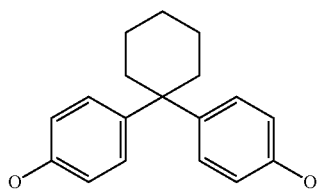
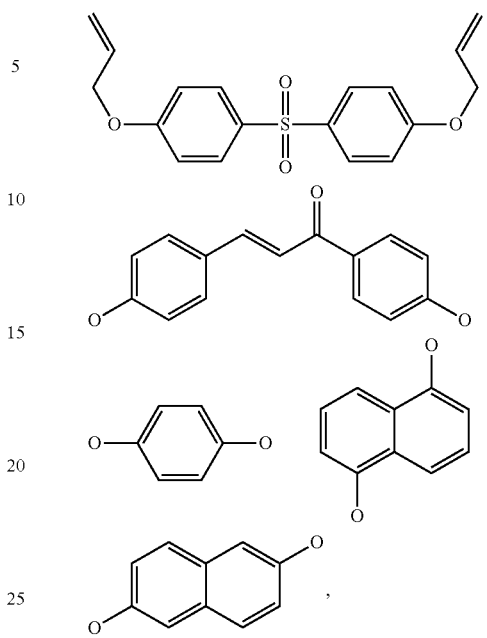
and
n is an integer of 10-500.
2. The aromatic polyester-based polymer according to claim 1, wherein the repeating unit represented by formula (I) comprises a repeating unit of one of the following formulae
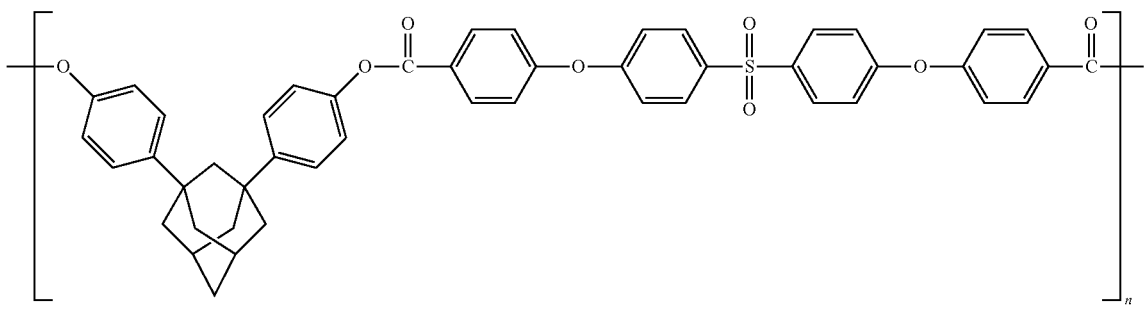
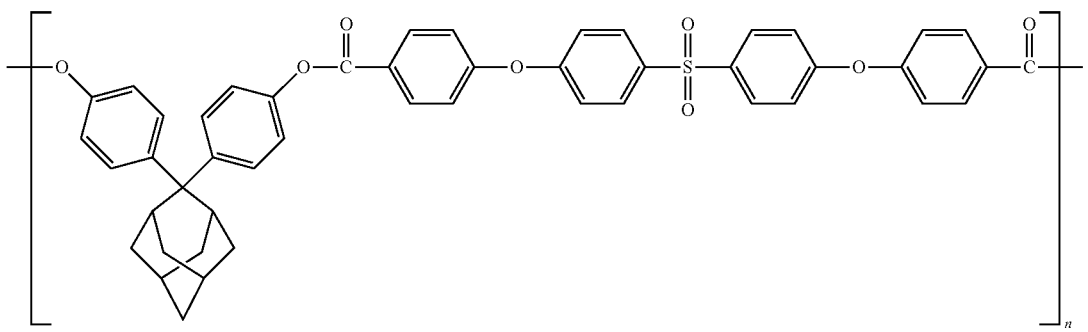

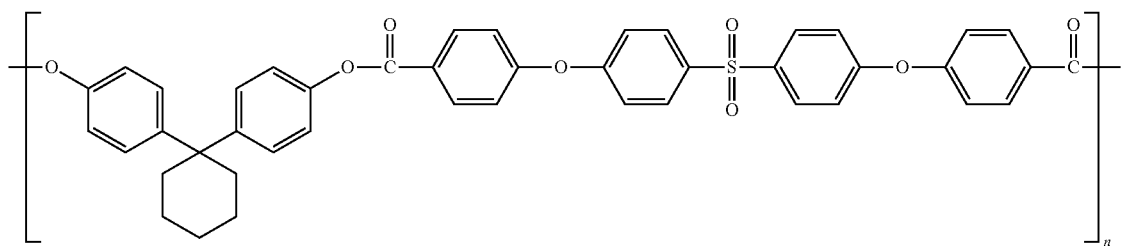
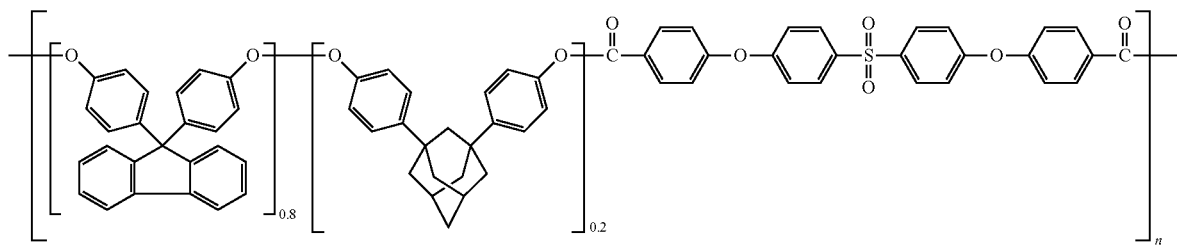
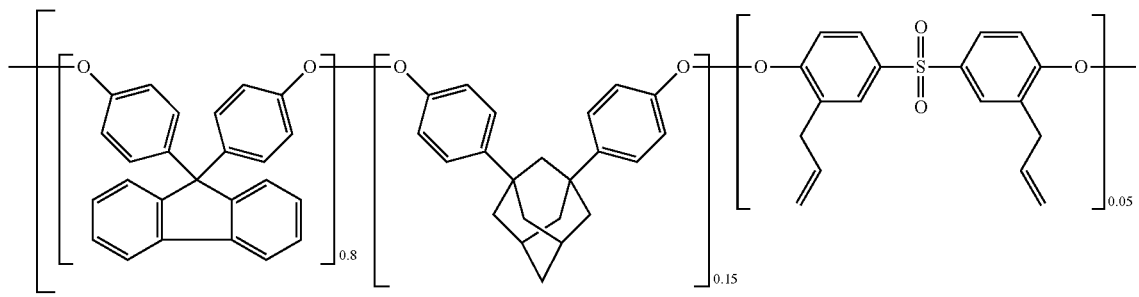
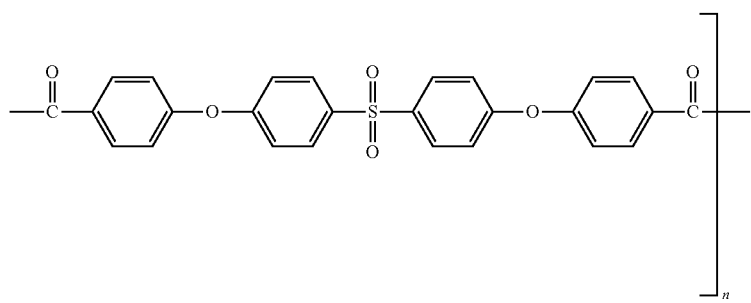
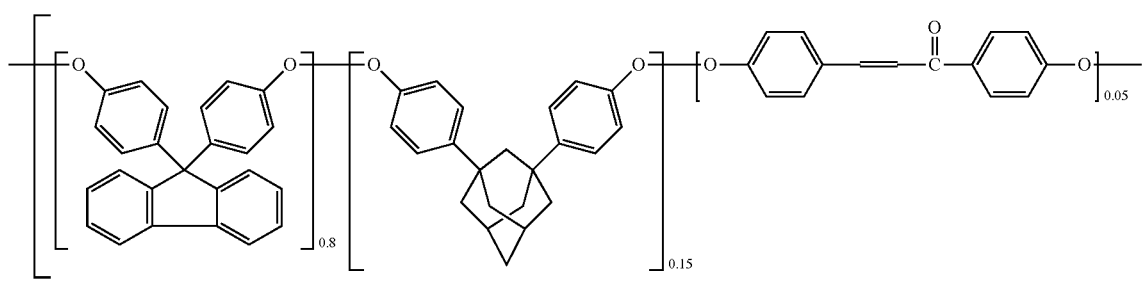

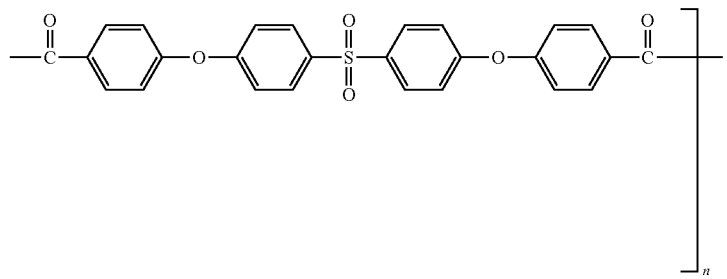

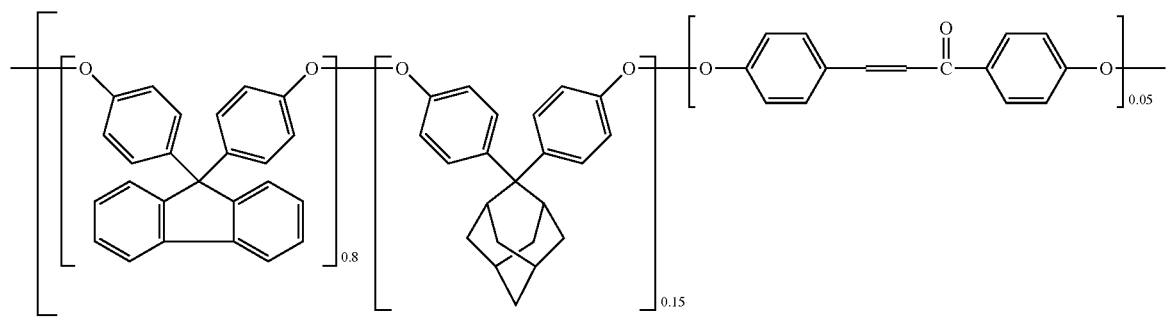

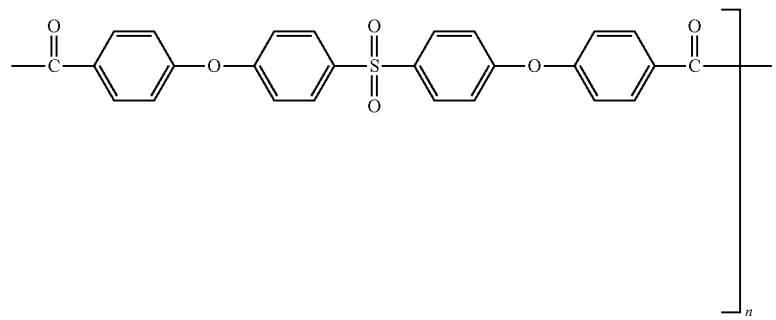

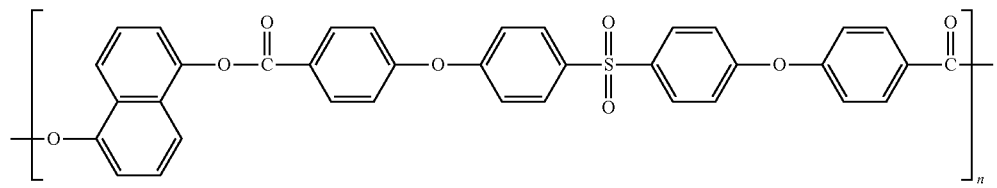

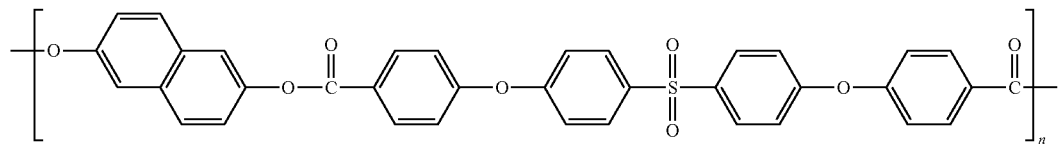

wherein n is an integer of 10-500.

3. The aromatic polyester-based polymer according to claim 1, which has a number average molecular weight (Mn) of 3000-300,000 and a glass transition temperature (Tg) of 230° C. or higher.

4. A method for preparing the aromatic polyester-based polymer represented by formula (I) according to claim 1, the method comprising dissolving an aromatic diol salt represented by formula (II) and an aromatic diacyl chloride compound (4,4'-(4,4'-sulfonyl-bis(4,1-phenylene)bis(oxy)dibenzoic chloride, SPOBAC) represented by formula (III) into water comprising a surfactant and a nonpolar solvent at a molar equivalent ratio, and carrying out interfacial polycondensation:

 (II)

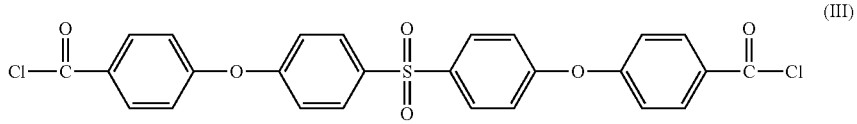
(III)

wherein M+ is an alkali metal cation, Ar is a substituted or non-substituted $C_6$-$C_{40}$ aromatic cyclic group, and $^-$O—Ar—O$^-$ is a diphenoxy structure derived from at least one of the following formulae:

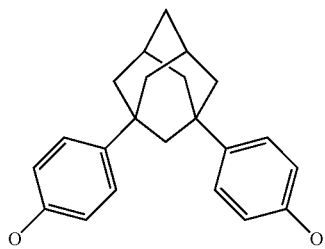

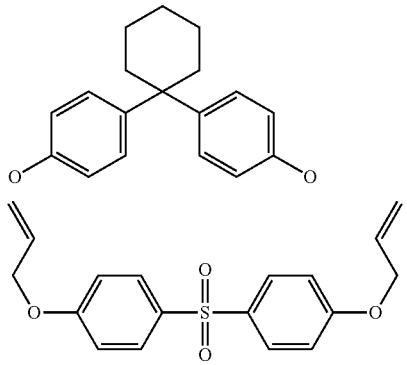

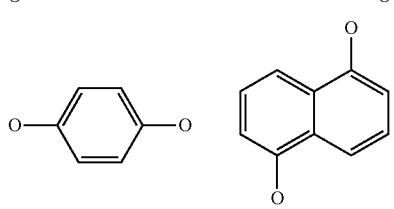

-continued

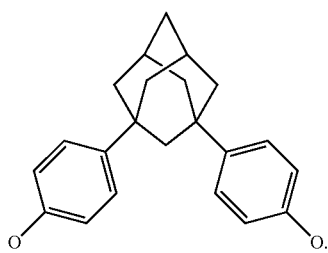

5. The method for preparing the aromatic polyester-based polymer according to claim 4, wherein the aromatic diol salt is produced by reacting an aromatic diol having a structure of a cardo based aromatic diol, non-cardo based aromatic diol or a mixture thereof with an alkali metal base.

6. The method for preparing the aromatic polyester-based polymer according to claim 5, wherein the alkali metal base is at least one selected from the group consisting of NaOH, KOH and $K_2CO_3$.

7. The method for preparing the aromatic polyester-based polymer according to claim 4, wherein the nonpolar solvent is at least one selected from the group consisting of methylene chloride (MC), 1,2-dichloroethane (DCE), cyclohexane, n-hexane, n-heptane, benzene, toluene, chlorobenzene and a mixed solvent thereof, and the surfactant is at least one selected from the group consisting of benzene tetraethylammonium chloride (BTEAC), benzene tetraethylammonium bromide (BTEAB), tetraethylammonium chloride (TEAC), tetraoctylammonium bromide (TOAB) and tetradodecylammonium chloride (TDAC).

8. The method for preparing the aromatic polyester-based polymer according to claim 5, wherein the alkali metal base is used at a molar equivalent ratio of 1.0-10 based on the aromatic diol.

9. The method for preparing the aromatic polyester-based polymer according to claim 7, wherein the surfactant is at a molar ratio of 1/10-1/50 based on the aromatic diol salt.

10. The method for preparing the aromatic polyester-based polymer according to claim 4, wherein the interfacial polycondensation is carried out at 25-135° C. for 2-12 hours.

11. The aromatic polyester-based polymer according to claim 1, wherein *—O—Ar—O—* is a diphenoxy structure derived from 12. The aromatic polyester-based polymer according to claim 1, wherein *—O—Ar—O—* is a diphenoxy structure derived from

13. The aromatic polyester-based polymer according to claim 1, wherein *—O—Ar—O—* is a diphenoxy structure derived from

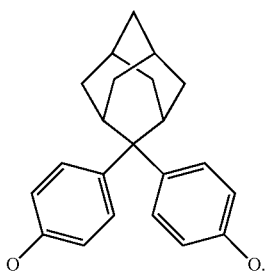

14. The aromatic polyester-based polymer according to claim 1, wherein *—O—Ar—O—* is a diphenoxy structure derived from

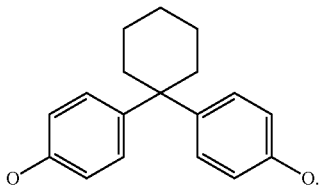

15. The aromatic polyester-based polymer according to claim 1, wherein *—O—Ar—O—* is a diphenoxy structure derived from

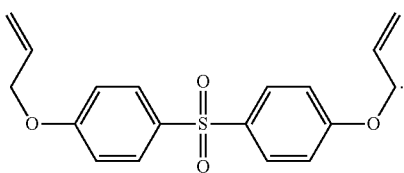 [SMILES: C=CCOc1ccc(S(=O)(=O)c2ccc(OCC=C)cc2)cc1]

16. The aromatic polyester-based polymer according to claim 1, wherein *—O—Ar—O—* is a diphenoxy structure derived from

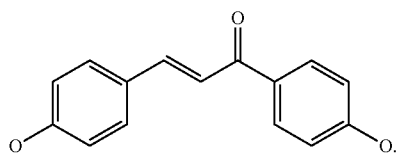

17. The aromatic polyester-based polymer according to claim 1, wherein *—O—Ar—O—* is a diphenoxy structure derived from

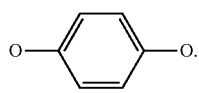

18. The aromatic polyester-based polymer according to claim 1, wherein *—O—Ar—O—* is a diphenoxy structure derived from

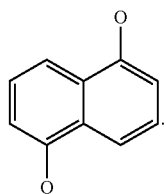 [SMILES: Oc1cccc2c(O)cccc12]

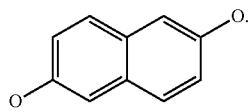

* * * * *